United States Patent
Raju

(10) Patent No.: US 9,003,550 B2
(45) Date of Patent: Apr. 7, 2015

(54) SYSTEMS AND METHODS FOR CRISIS MANAGEMENT AND SITUATIONAL AWARENESS

(71) Applicant: Sri Penmetsha Raju, Sugar Land, TX (US)

(72) Inventor: Sri Penmetsha Raju, Sugar Land, TX (US)

(73) Assignee: Smartbridge, LLC, Houston, TX (US)

( * ) Notice: Subject to any disclaimer, the term of this patent is extended or adjusted under 35 U.S.C. 154(b) by 5 days.

(21) Appl. No.: 13/732,000

(22) Filed: Dec. 31, 2012

(65) Prior Publication Data

US 2014/0189887 A1 Jul. 3, 2014

(51) Int. Cl.
| | |
|---|---|
| G06F 17/30 | (2006.01) |
| H04L 29/06 | (2006.01) |
| H04L 12/58 | (2006.01) |
| H04W 4/08 | (2009.01) |
| H04W 4/22 | (2009.01) |

(52) U.S. Cl.
CPC ............... *H04L 63/10* (2013.01); *H04L 51/04* (2013.01); *H04L 63/08* (2013.01); *H04L 63/101* (2013.01); *H04W 4/08* (2013.01); *H04W 4/22* (2013.01)

(58) Field of Classification Search
CPC ....... G06F 21/44; G06F 21/445; G06F 21/62; H04L 63/08; H04L 63/10; H04L 63/101; H04L 29/08144
USPC ...................... 726/2–4, 26–30; 713/168, 193; 709/217, 225, 229
See application file for complete search history.

(56) References Cited

U.S. PATENT DOCUMENTS

| | | | |
|---|---|---|---|
| 5,787,177 A * | 7/1998 | Leppek | 713/164 |
| 6,678,828 B1 * | 1/2004 | Pham et al. | 726/2 |
| 7,646,854 B2 | 1/2010 | Anderson | |
| 7,827,598 B2 * | 11/2010 | Moran et al. | 726/4 |
| 7,869,387 B2 | 1/2011 | Black | |
| 7,900,240 B2 * | 3/2011 | Terzis et al. | 726/2 |
| 7,991,124 B2 | 8/2011 | Anderson | |
| 8,077,634 B2 | 12/2011 | Maggenti et al. | |
| 2004/0004942 A1 | 1/2004 | Nebiker et al. | |
| 2005/0143106 A1 | 6/2005 | Chan et al. | |
| 2008/0139165 A1 | 6/2008 | Gage et al. | |
| 2010/0296641 A1 | 11/2010 | Goel et al. | |

\* cited by examiner

*Primary Examiner* — Hosuk Song
(74) *Attorney, Agent, or Firm* — Chowdhury & Georgakis, P.C.

(57) ABSTRACT

Systems and methods for managing events, including either a server or a client device, are provided. Assets and events are defined. Information is received by a client device via an input device, associated with an asset and an event, and transmitted to the server. Information is also received by a client device from another client device. Client devices also access information from the server and display the accessed information and information received from other client devices. The server receives information from client devices and stores the information in association with an asset and an event to which the information pertains. The server also receives and stores information from client devices that is designated for transmission to other client devices. The server also permits client devices to access its stored information. The server stores multiple pieces of information pertaining to the same asset or event in association with each other.

73 Claims, 26 Drawing Sheets

SYSTEMS AND METHODS FOR CRISIS MANAGEMENT AND SITUATIONAL AWARENESS

CROSS-REFERENCE TO RELATED APPLICATIONS

Not applicable.

STATEMENT REGARDING FEDERALLY SPONSORED RESEARCH

Not applicable.

TECHNICAL FIELD OF THE INVENTION

The present disclosure relates generally to systems, methods, and apparatuses for crisis management and situational awareness. More particularly, the disclosure relates to systems, methods, and apparatuses for disaster recovery and business continuity by means of improved communication, tracking and related activities, applicable to a group of geographically distributed assets and mobile-based users.

BACKGROUND

Events such as natural and man-made disasters cause major interruptions to business operations of large public and private organizations. Existing approaches to situational awareness, disaster recovery and business continuity tend to track information using spreadsheets and to exchange information by ordinary email based systems. In addition, key parties responsible for managing the crisis tend to be restricted to operate via a computer located in a central command center. These approaches inhibit speed, reliability and flexibility in the capture, exchange, accessing, tracking, recording and other management of information, the interaction between geographically remote parties, and the implementation of recovery measures and other responses, which are necessary or conducive to effective and efficient disaster recovery and business continuity. In short, prior art approaches are overly slow, complex, error-prone, and rigid.

SUMMARY

Embodiments of the present invention provide systems, methods, and apparatuses for crisis management and situational awareness that address the aforementioned areas for improvement.

According to a first aspect of the invention, there is provided a system for managing events comprising a server, the server comprising a processor configured for executing software; a network interface configured for communicating with a plurality of client devices via a communication network; a memory configured for storing software and information; and software. The software, when executed by the processor, is operable to: define one or more items, each item comprising an event or an asset; receive, from a first one of the client devices via the communication network, first information and, in association with the first information, first data indicating a first item to which the first information pertains; store the received first information and, in association therewith, the received first data in the memory; and permit ones of the client devices to access the received first information via the communication network.

According to a second aspect of the invention, there is provided a method for managing events, performed by software operating on a server, the server comprising a processor configured for executing software, a network interface configured for communicating with a plurality of client devices via a communication network, a memory configured for storing software and information, and software. The method comprises: defining one or more items; receiving, from a first one of the client devices via the communication network, first information and, in association with the first information, first data indicating a first item to which the first information pertains; storing the received first information and, in association therewith, the received first data in the memory; and permitting ones of the client devices to access the received first information via the communication network.

According to a third aspect of the invention, there is provided a client device for managing events, comprising a processor configured for executing software; a network interface configured for permitting the client device to communicate with a server and with other client devices via a communication network; an input device configured for permitting information to be inputted into the client device; a memory configured for storing software, information inputted via the input device, and information received via the communication network; and software executable by the processor. The software when executed is operable to: define one or more items; receive first information inputted via the input device; associate first data with the first information, the first data indicating a first item to which the first information pertains; transmit, to the server via the communication network, the first information and, in association with the first information, the first data; access, from the server via the communication network, second information and, in association therewith, second data indicating a second event and a second asset to which the second information pertains.

According to a fourth aspect of the invention, there is provided a method for managing events, performed by a software application operating on a client device. The client device comprises: a processor configured for executing the software application; a network interface configured for permitting the client device to communicate with a server and with other client devices via a communication network; an input device configured for permitting information to be inputted into the client device; a memory configured for storing the software application, information inputted via the input device, and information received via the communication network; and the software application. The method comprises: defining one or more items; receiving first information inputted via the input device; associating first data with the first information, the first data indicating a first item to which the first information pertains; transmitting, to the server via the communication network, the first information and, in association with the first information, the first data; accessing, from the server via the communication network, second information and, in association therewith, second data indicating a second event and a second asset to which the second information pertains According to each of a fifth and sixth aspect of the invention, there is provided an article of manufacture comprising a non-transitory machine-accessible medium containing instructions that, when executed by a machine, enable the machine to perform the methods of the second and fourth aspects, respectively.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIG. 12 is a screenshot of a setup screen for defining authorized users, in accordance with some embodiments;

FIG. 19 is a screenshot of a status report screen for viewing reports on the status of assets in accordance with some embodiments;

NOTATION AND NOMENCLATURE

Figure 1:
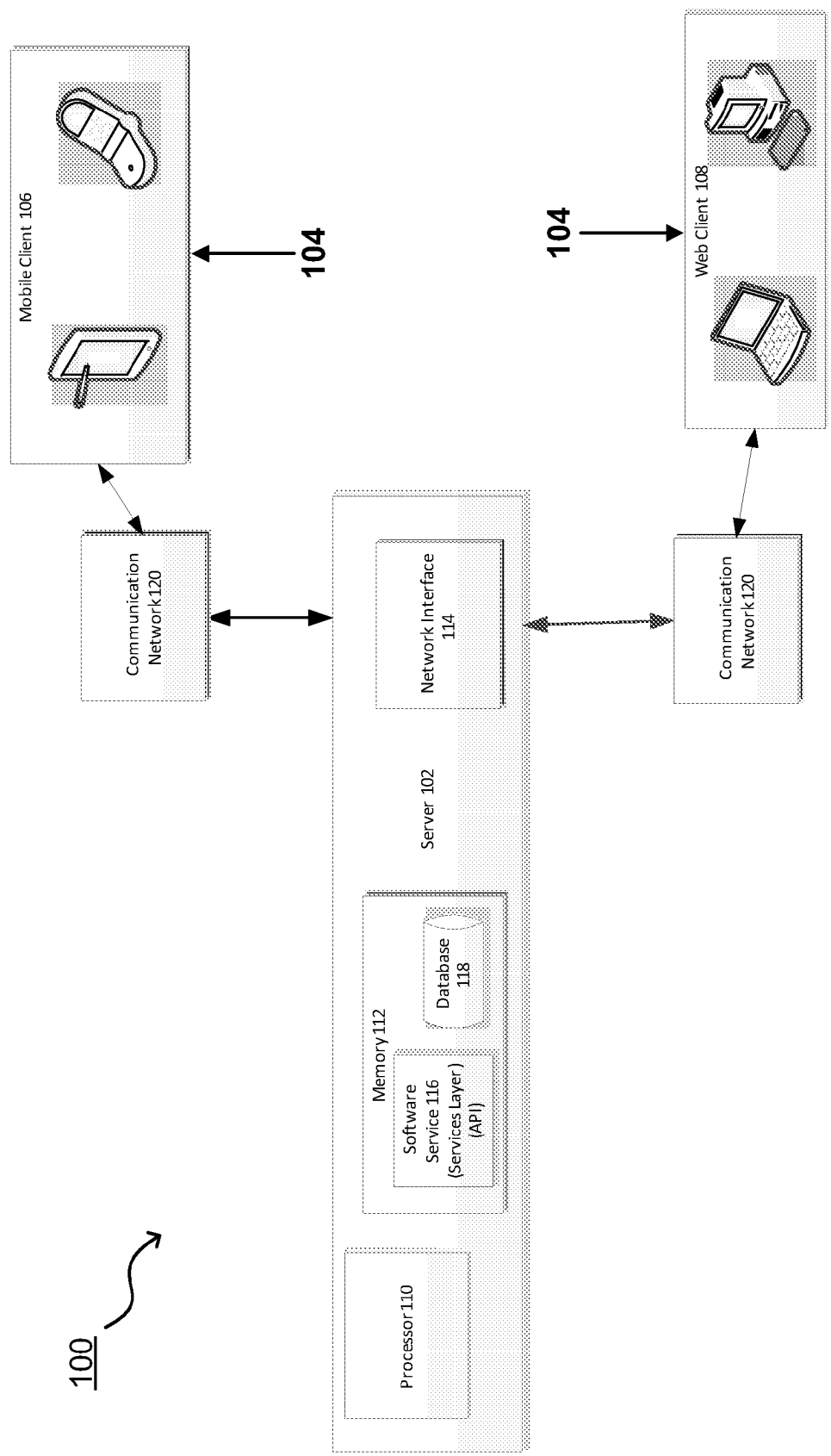
FIG. 1 is a schematic view of a crisis management system, in accordance with some embodiments.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . . "

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. Relatedly, certain features may be omitted in certain figures, and this may not be explicitly noted in all cases.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described or illustrated in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

A brief overview of the present disclosure will be provided, followed by a more detailed description.

Embodiments of the present invention address the above-mentioned problems, and may improve the speed, reliability and flexibility in the capture, exchange, accessing, tracking, recording and other management of information, the interaction between geographically remote parties, and the implementation of recovery measures and other responses, which are necessary or conducive to effective and efficient disaster recovery and business continuity. Embodiments of the present invention may provide for real-time or near-real-time capture, exchange, accessing, tracking, recording and other management of information, and interaction between geographically remote parties, such as may quicken implementation of recovery measures and other responses.

For convenience, embodiments of the present invention may be described with reference to "disaster recovery" and "business continuity," but this terminology is not to be taken as limiting and it is to be understood that such embodiments of the present invention are also applicable to other situations such as emergencies, crises, problems, and the like, including ordinary or routine situations, e.g., where a task/goal is being worked on/toward by a group. "Situational Awareness/Disaster recovery/business continuity" and the like terms are thus to be understood as shorthand expressions in this respect.

Embodiments of the present invention provide a multi-functional situational awareness and crisis management system. For example, the multi-functionality includes, for example: inputting information, e.g., status information concerning a disaster and its impact on assets that may include property, vehicles, buildings, infrastructure, utilities, medical facilities and other types of assets; communicating—sending and receiving messages, e.g., with other members of a group working together, e.g., to assess disaster impact, or recover from a disaster; storing information, e.g., inputted information and sent messages; organizing stored information, e.g., associating information pertaining to a specific asset affected by the disaster; accessing stored information, e.g., from a central database, and viewing the accessed information, e.g., on a display; sending alerts, e.g., regarding updates, to group members or a pertinent subset of them; recording/archiving information/maintaining a history, e.g., of subsequent updates, which can be accessed/viewed; performing reporting and analytics on information received and generating analytic results, e.g., in the form of graphs, tables, or the like, which can be accessed/viewed; authorizing and authenticating users; and grouping users, e.g., as members of a disaster response team assigned to a particular asset, or as members of a recipient list for communicating messages. This list of functions is not exhaustive. In large part, the functions may be performed by any user, anywhere, anytime, although the system may generally be configured such that certain functions are under the sole purview of a central authority or unit, e.g., maintaining the authoritative version of archived information. Individual users may perform the functions using a software application on an electronic device, which may be mobile/portable, the software application using web services from a service layer provided by a system administrator. The system may be implemented as a server-client system in which the aforesaid electronic devices of individual users, who may be geographically remote from one another and from the central authority/unit, are client devices, which access a server to use the web services and databases. The central authority/unit may also operate as such a client device, or as the server. By having the central authority/unit operate as a client device, the central authority/unit may be located at or near the site of a disaster while the server may be located remotely, which may render the central authority more responsive and effective while rendering the server more robust (e.g., able to perform operations more reliably, able to store information more securely). This is discussed further below under the rubric of "remote third party hosting" of the system. The term "information" may be used herein as a broad, inclusive term, including, e.g., messages. With respect to the term "asset," while the disclosure generally uses this term with reference to physical (movable or immovable) property, the term is to be understood as also encompassing other entities, e.g., personnel and abstract entities such as organizational units.

Embodiments of the present invention provide a situational awareness and crisis management system that accommodates multi-media content and social media content. For example, the multi-media content includes: textual information, including formatted and freeform information, graphical information, images, videos, audio information, e.g., recordings or synthesized speech. Social media content may come from various popular social media applications, e.g., Facebook™, Twitter™ or Google+™. This list of content is not exhaustive. The multi-media and social media content may be manipulated, e.g., in terms of the functions listed above (inputted, stored, organized, archived, viewed, transmitted, etc.).

Embodiments of the present invention provide a situational awareness and crisis management system that provides multiple modes of communication. Communication may be performed between any and all of multiple geographically distributed points (e.g., users) and a center (e.g., central command center/central authority). For example, communication can be performed point to point, point to center, center to point, point to multiple points, center to multiple points, point to point and center, point to multiple points and center. The system may be configured to permit point to point and point to multiple point communication to occur via the center or directly from point to point/multiple points. This list of modes of communication is not exhaustive.

Embodiments of the present invention provide a situational awareness and crisis management system that provides remote third party hosting of software/server. The server, including software and one or more databases for storing information may be hosted by a third party at a location remote from the users, where the disaster occurs. It is possible to implement the database(s) as unit(s) separate from the server. With remote third party hosting, the users affected by the disaster do not have to support the information technology (IT) infrastructure and staff for the situational awareness and crisis management system. Remote third party hosting may provide enhanced reliability/availability of the system during a disaster, security, and convenience.

In response to a disaster, a recovery team may be assembled to handle the disaster to ensure minimum interruption to business operations. Multiple teams may be assembled, e.g., local response teams assigned to handle given assets in different geographic locations, and a central response team overseeing multiple local response teams. Groups may also be formed, such as groups of authorized users, authorized to perform certain tasks, access certain information or the like. Groups of users may also be formed as recipient lists for receiving communications, or communications pertaining to a certain asset/location, etc.

A brief overview has been provided above; it is not intended to be exhaustive. A more detailed description follows. For the sake of brevity, a situational awareness and crisis management system may be referred to in this disclosure as a crisis management system.

Figure 2:
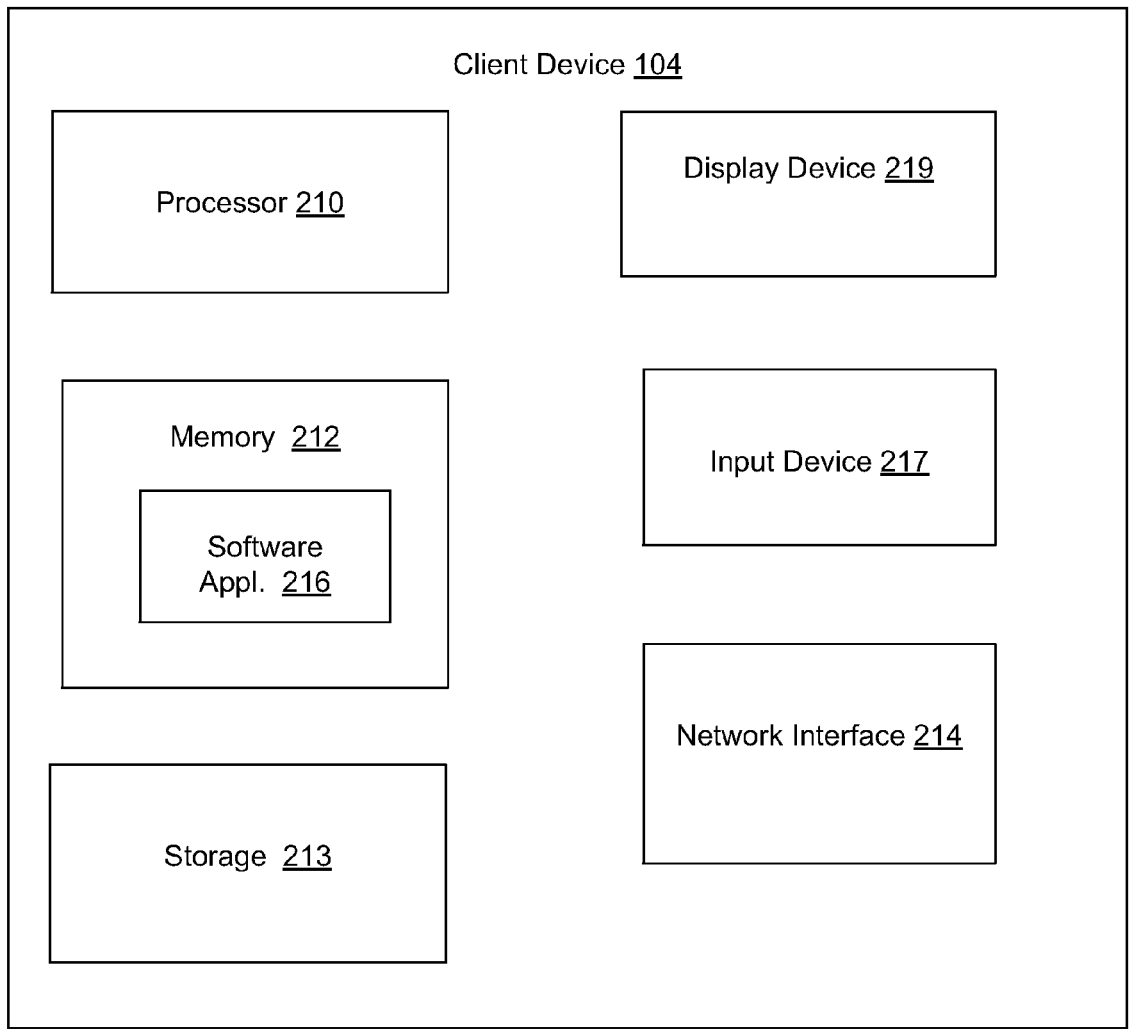
FIG. 2 is a schematic view of a client device of a crisis management system, in accordance with some embodiments.
Figure 3:
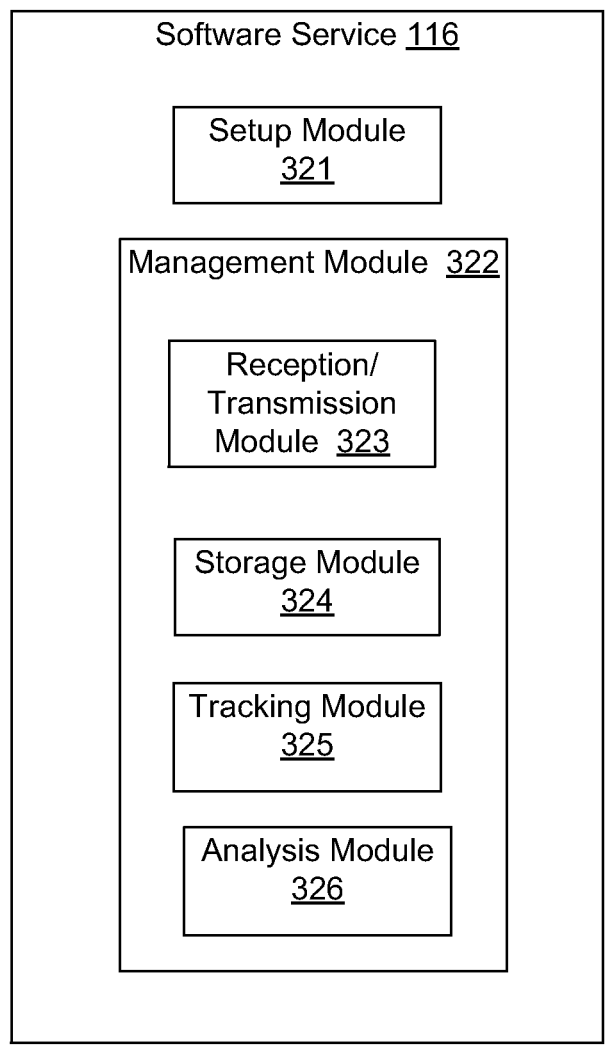
FIG. 3 is a schematic view of a software service on the server of a crisis management system, in accordance with some embodiments.
Figure 4:
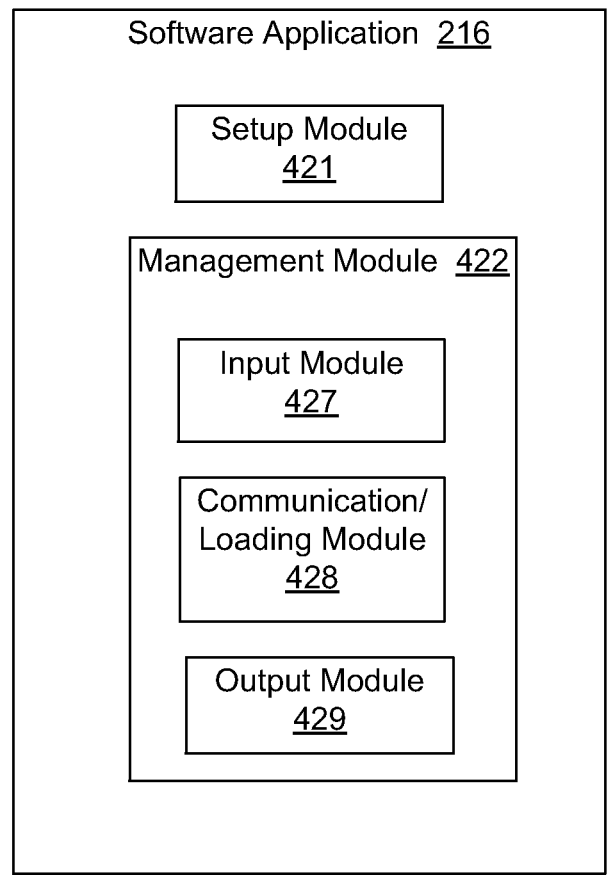
FIG. 4 is a schematic view of a software application on a client device of a crisis management system, in accordance with some embodiments.
Figure 5:
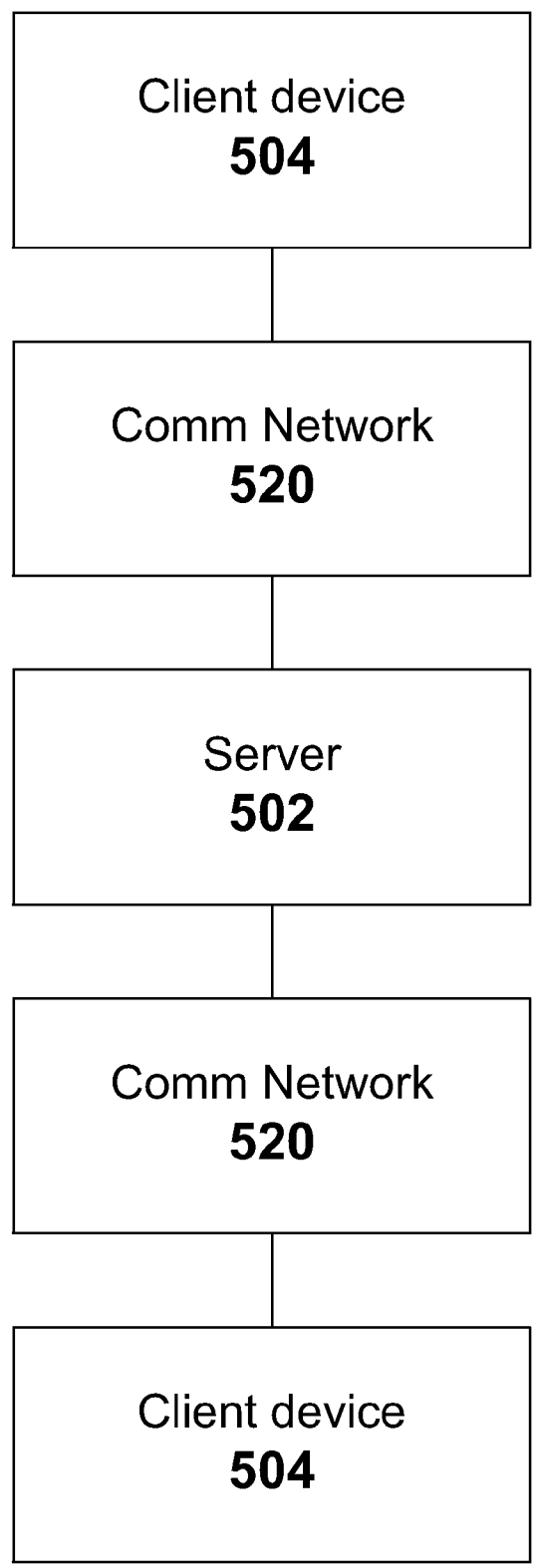
FIG. 5 is a schematic view of a first arrangement of the flow of communication among elements of a crisis management system, in accordance with some embodiments.
Figure 6:
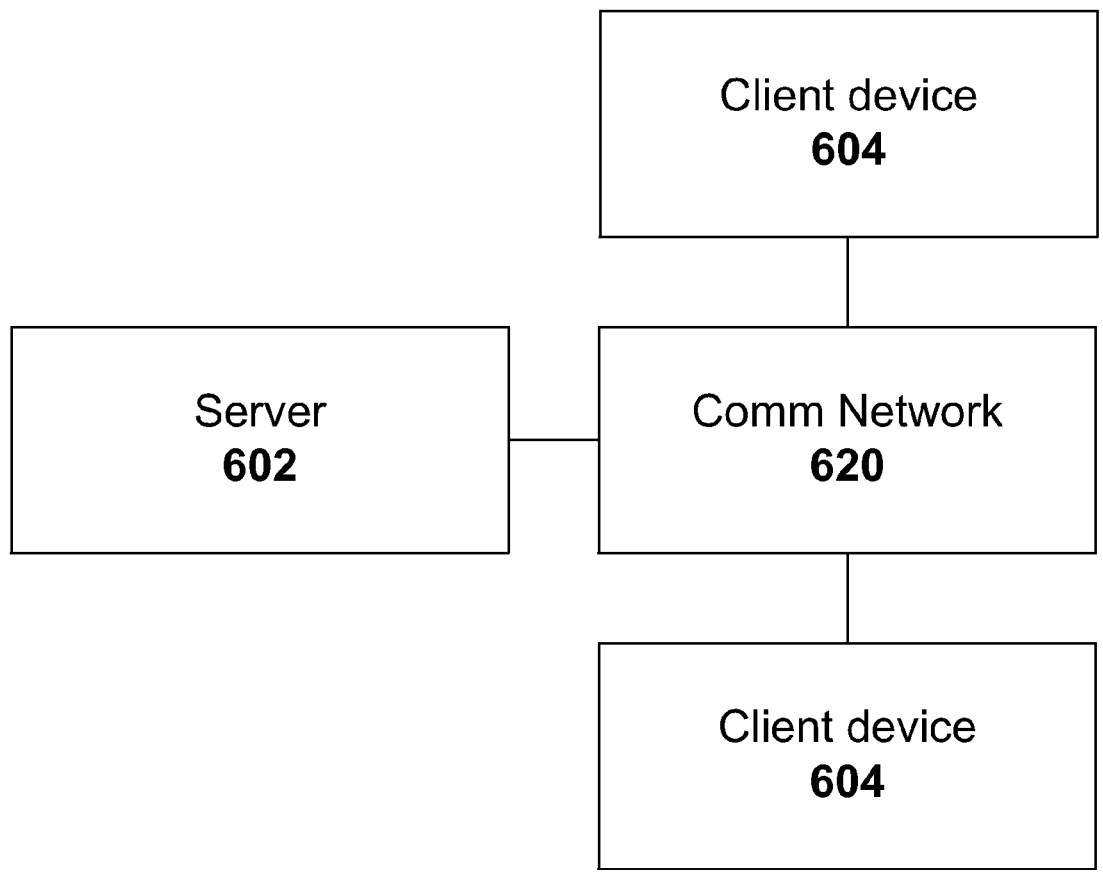
FIG. 6 is a schematic view of a second arrangement of the flow of communication among elements of a crisis management system, in accordance with some embodiments.

According to embodiments of the present invention, a crisis management system, including a server, client devices, a software service on the server, a central database, and a software application on the client devices, among other components, will be described with reference to FIGS. 1-6. FIG. 1 provides an overview of such a crisis management system, while FIG. 2 illustrates a client device thereof. FIG. 3 illustrates such a software service on the server, while FIG. 4 illustrates such a software application on a client device. FIG. 5 illustrates a first arrangement of the flow of communication among the server and the client devices of a crisis management system, in accordance with some embodiments. FIG. 6 illustrates a second arrangement of the flow of communication among the server and the client devices of a crisis management system, in accordance with some embodiments.

With reference to FIG. 1, a crisis management system 100 will be described. Crisis management system 100 includes a server 102 and client devices 104. Client devices 104 may include mobile client devices 106 and web client devices 108. Mobile client devices 106 are electronic devices that are portable or mobile and include, e.g., mobile phones, such as smartphones (e.g., iPhones™, Android™ phones, Windows™ phones, BlackBerry™ smartphones), tablets (e.g., iPads™, Android™, Microsoft Surface™ tablets), etc. Web client devices 108 are electronic devices that are not considered (as) portable or mobile as mobile client devices 106 and include, e.g., personal computers, such as laptop and desktop computers, etc. Any client device 104, be it a mobile client device 106 or a web client device 108, may be used onsite (e.g., at an asset, which may be affected by a disaster) by an onsite user and/or at the location of a central authority/unit by a central authority user, the central authority, for example, having authority over multiple sites. As an example, the central authority/unit may be a corporate headquarters, and the multiple sites may be different branches (e.g., retail outlets, production facilities, etc.) of the corporation.

Server 102 may include a processor 110, a memory 112, and a network interface 114. Memory 112 may include software service 116 and a database 118. Processor 110 is configured to execute software service 116, which performs functions of crisis management system 100 on server 102, including providing web services, HTTP request services and other forms of data access for use by client devices 104 to perform functions of crisis management system 100. In the course of performing such functions, database 118 serves to securely store information, e.g., information inputted by users of client devices 104 and subsequently uploaded from client devices 104 to server 102, such as status information concerning the status of an asset affected by a disaster, and messages sent by users of client devices 104 to users of other client devices 104 (as noted, the term "information" may be used to refer to/include such messages). Status of an asset may include information about the impact of a disaster on various attributes of the asset. Processor 110 may generate and database 118 may securely store reports containing results generated by analysis of this information. Network interface 114 is configured for enabling server 102 to communicate with client devices 104 via a communication network 120. Communication network 120 may include a wired network, a wireless network, and facilities for data transmittal over telecommunications networks and services, and network interface 114 may include appropriate corresponding interfaces. (Although two boxes labeled "120" are depicted in FIG. 1, they may be understood as representing a single communication network. Further discussion in this regard is given below with reference to FIGS. 5 and 6.) Functions of crisis management system 100 will be described below.

With reference to FIG. 2, a client device 104 of crisis management system 100 will be described. Client device 104 may include a processor 210, a memory 212, and a network interface 214. Memory 212 may include a software application 216. Processor 210 is configured to execute software application 216, which performs functions of crisis management system 100 on client device 104, using web services and HTTP request services provided by server 102. Network interface 214 is configured for enabling client device 104 to communicate via communication network 120 with other client devices 104 and with server 102. Network interface 214 may include appropriate interfaces as does network interface 114.

Client device 104 may also include an input device 217 and a display device 219. Input device 217 may serve to input information into client device 104, as may occur in the course of performing functions of crisis management system 100. Such information may be information inputted by a user of client device 104 and subsequently uploaded from client device 104 to server 102, such as status information concerning the status of an asset or entity affected by a disaster, and messages (or message content and meta-content) sent by a user of client device 104 to a user of another client device 104 (as noted, the term "information" may be used to refer to/include such messages/message content). Input device 217 may thus encompass one or more user interface devices such as a keyboard, camera, microphone, etc. Information may be inputted into input device 217 by express action of a user (e.g., typing on a keyboard, speaking into a microphone, taking a picture), or in an automatic or (pre-)programmed fashion, either programmed by express action of a user or otherwise automated/programmed, whereby client device 104 operates to automatically input information via input device 217 (e.g., pre-programmed to take a picture every x minutes). The term "information" may encompass textual, graphical, image, video, audio or other content. Such information may also be referred to as "content" or other like terms. Network interface 214 may serve to transmit data back and forth from input device 217, memory 212, software application 216 and server 102 (i.e., server 502 or server 602, see FIGS. 5 and 6). This transmission may be in real-time when network connectivity is available, e.g., through either Wi-Fi network or cellular network such as AT&T, Verizon, Sprint and other similar networks. When Wi-Fi or cellular network is not available for immediate transmission, the data from client device 104 may be stored locally in memory 212 and storage 213 and transmitted by software application 216 later when network interface 214 is able to establish connection with server 102 (i.e., server 502 or 602). Storage 213 may be a local database or file storage on client device 104. Alternatively to FIG. 2, storage 213 may be instantiated as a part of memory 212.

Display device 219 may serve to display information to a user of client device 104, as may occur in the course of performing functions of crisis management system 100. Such information may encompass text, graphics, images (e.g., photographs), video, etc. In addition to display device 219, client device 104 may include other output devices (not shown) for providing output other than visual/graphical output. For example, client device 104 could include a speaker (not shown) for providing audio output, e.g. a sound recording, synthesized speech, etc.

Functions of crisis management system 100, as mentioned above with respect to client device 104, will be described below.

With reference to FIG. 3, software service 116, residing on server 102, will be described. Software service 116 may include a setup module 321 and a management module 322. Setup module 321 may perform functions of setting up crisis management system 100 for operation at the server end, as will be described below. Management module 322 may include a reception/transmission module 323, a storage module 324, a tracking module 325, and an analysis module 326. Reception/transmission/storage module 323 may perform functions of receiving information (e.g., status information, messages) from external tracking systems such as Global Positioning Satellites (GPSs), external systems or client devices 104 and transmitting information to client devices 104, as will be described below. Storage module 324 may perform functions of storing information in database 118 of server 102, as will be described below. Tracking module 325 may perform functions of organizing information received from external tracking systems such as GPSs, external systems or client device 104, e.g., on the basis of subject matter (e.g., associating together information pertaining to the same asset) and on the basis of chronology (e.g., keeping track of the input times of different updates of a given asset and maintaining a history of the updates of the given asset according to their input times), as will be described below. Analysis module 326 may perform functions of analyzing information received from client devices 104 and generating reports based on the results of such analysis, the reports to be accessed from server 102 by client devices 104, as will be described below.

With reference to FIG. 4, software application 216, resident on client device 104, will be described. Software application 216 may be downloaded on client device 104, e.g., as an application for a mobile device purchased from a distributor of applications (e.g., App Store, Amazon Appstore, Microsoft AppStore etc.). A web version of software application 216 may also be accessible directly from the web (internet) through a client device 104 such as a computer, tablet device such as iPad, or Smartphone devices. Software application 216 may be distributed as Software as a Service (SaaS) on a subscription basis. Software application 216 may include a setup module 421 and a management module 422. Setup module 421 may perform functions of setting up crisis management system 100 for operation, as will be described below. Management module 422 may include an input module 427, a communication/loading module 428 and an output module 429. Input module 427 may perform functions of inputting information (e.g., status information of an asset) into client device 104, as will be described below. Communication/loading module 428 may perform functions of uploading inputted information (e.g., status information, messages) from client device 104 to server 102 and downloading information from server 102 to client device 104, as will be described below. Output module 429 may perform functions of outputting information on client device 104, as will be described below.

With reference to FIGS. 5 and 6, two different arrangements of the flow of communication among the server and the client devices of a crisis management system such as crisis management system 100, in accordance with respective groups of embodiments, will be described. Crisis management system 500 of FIG. 5 is characterized in that all communication—all transmission of information—occurs via server 502. Thus, a message sent from one client device 504 to another client device 504 is transmitted via communication network 520 first to server 502, and then from server 102 via communication network 520 to the other client device 504. (Although two boxes labeled "520" are depicted in FIG. 5, they may be understood as representing a single communication network.) This arrangement ensures that server 502 receives all communications sent between client devices 504. Crisis management system 600 of FIG. 6 is characterized in that communications may be transmitted from one client device 604 via communication network 620 directly to another client device 604, without going via server 602. To be sure, in the arrangement of FIG. 6, crisis management system 600 could be configured such that whenever a client device 604 sends a message to another client device 604, the message is also automatically sent to server 602. In this way, even under the arrangement of FIG. 6, it would be ensured that server 602 receives all communications between client devices 604.

It will be noted that the communication arrangement of crisis management system 500 shown in FIG. 5 corresponds to that of crisis management system 100 shown in FIG. 1. However, crisis management system 100 could alternatively be configured according to the communication arrangement of crisis management system 600 shown in FIG. 6. Preferably, crisis management system 100 is configured such that server 102 receives and stores all communications sent from any one client device 104 to any other client device 104, whether under the communication arrangement of crisis management system 500 shown in FIG. 5, or under the communication arrangement of crisis management system 600 shown in FIG. 6, under the aforesaid configuration of crisis management system 600. Note that, as also mentioned below, if communication between client device 104 and server 102 is temporarily unavailable, client device 104 may be configured such that information designated for transmission from client device 104 to server 102 is stored locally on storage 213 of client device 104 and is subsequently transmitted to server 102 for processing by server 102, when communication between client device 104 and server 102 becomes available.

Functions of crisis management system 100, as mentioned above in the description of FIGS. 1-6, will be further described in the below discussion of crisis management methods, or methods of operation of crisis management system 100. Otherwise, further details of the structure and operation of server 102, software service 116, client devices 104, software application 216, and their various components set forth above will be understood by one of ordinary skill in the art.

Figure 7:
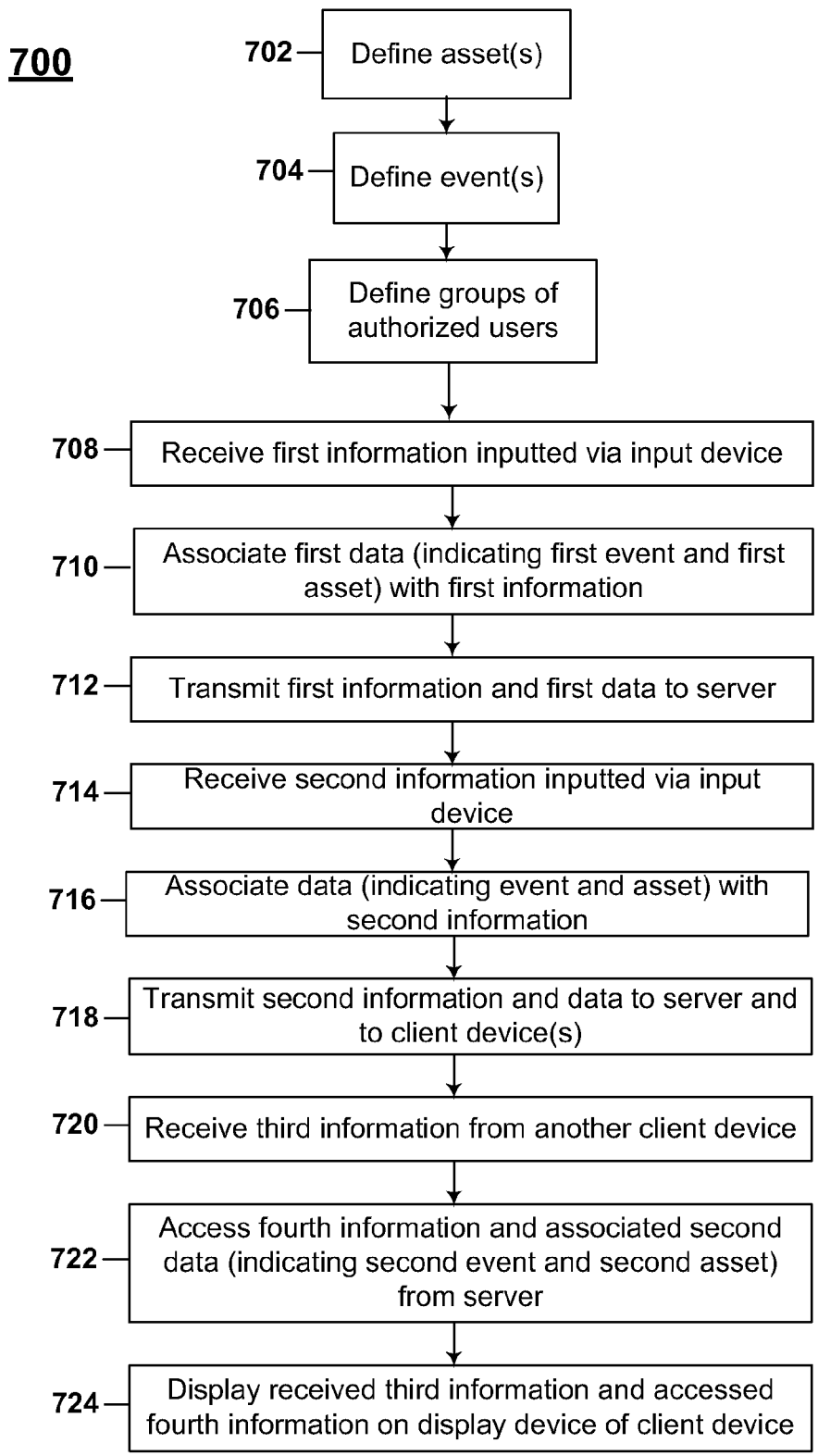
FIG. 7 is a flow chart illustrating a crisis management method, as performed by a server of a crisis management system, in accordance with some embodiments.
Figure 8:
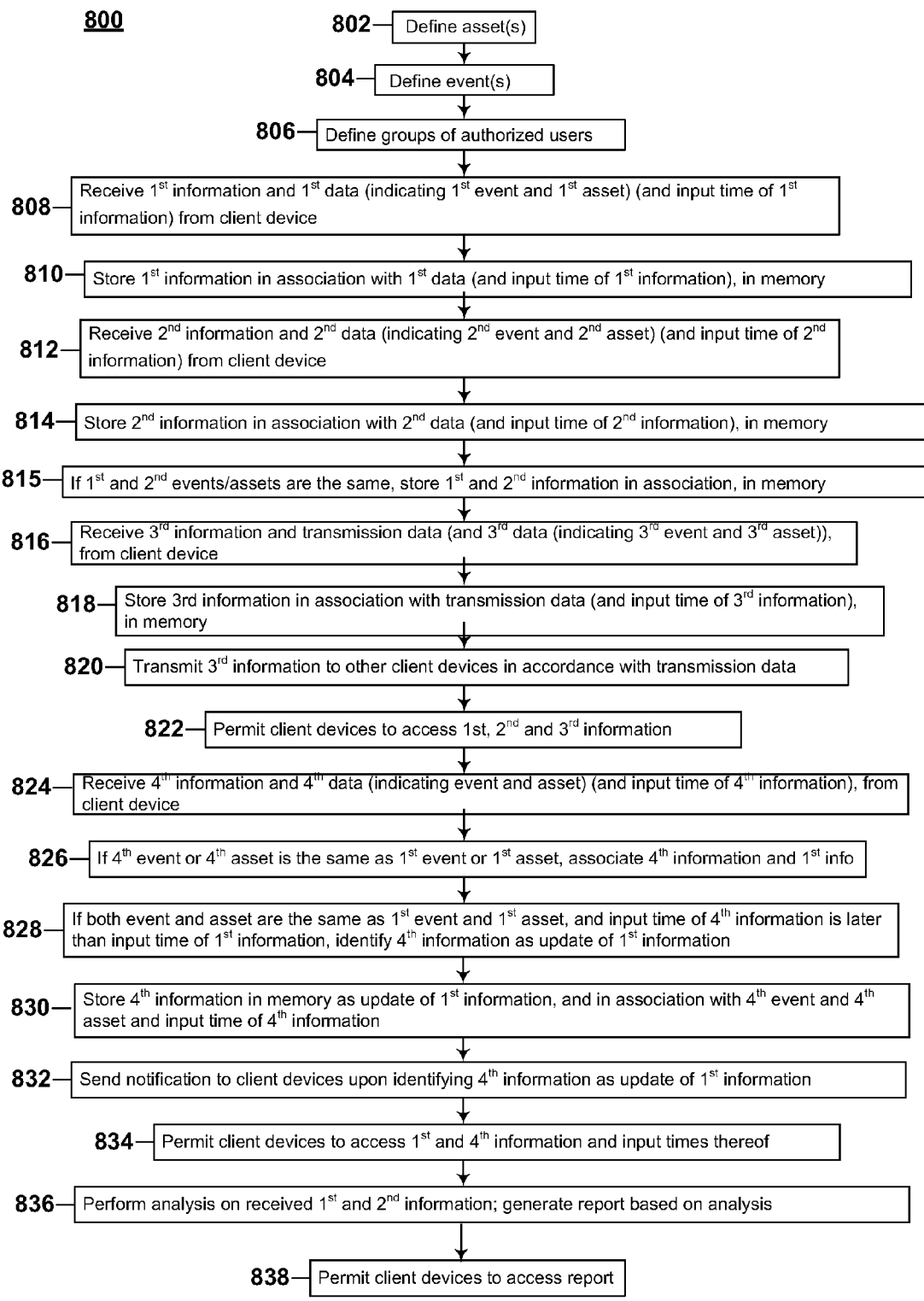
FIG. 8 is a flow chart illustrating a crisis management method, as performed by a client device of a crisis management system, in accordance with some embodiments.

Crisis management methods, or methods of operating crisis management system 100, will now be described. An overview of such methods will first be described with reference to FIGS. 7 and 8, followed by a more detailed description with additional reference to FIGS. 9-24. FIG. 7 is a flow chart illustrating a crisis management method 700, as performed by a software application 216 on a client device 104 of a crisis management system 100, in accordance with some embodiments, while FIG. 8 is a flow chart illustrating a crisis management method 800, as performed by a software service 116 on server 102 of a crisis management system 100, in accordance with some embodiments. It will be understood that the following description of FIGS. 7 and 8 is applicable to the arrangements of both FIGS. 5 and 6.

Turning to FIG. 7, crisis management method 700, as performed by software application 216 on client device 104, will be described. In accordance with various embodiments, some or all of the steps of crisis management method 700 may be performed. The order of the steps may be varied.

At step 702 one or more assets are defined, in accordance with user input. At step 704, one or more events (crisis events) are defined, in accordance with user input. At step 706, one or more groups of authorized users are defined, in accordance with user input. In this regard, users may be authorized, for example, to input/send/receive/access information for a certain event or for a certain asset, or to perform certain functions, such as locking or unlocking a status of an event or asset. After a user has been authorized, the user may be authenticated upon attempting to perform an action (e.g., input, send, receive, or access information) on client device 104. Authentication may be accomplished by requiring a user to log in using the user's email address, password, and/or license key (license to the software product having the software application 216), or in any appropriate manner known to one of ordinary skill in the art.

Steps 702 through 706 may be performed by setup module 421 of software application 216, and these steps may be referred to collectively as the setup portion of crisis management method 700.

At step 708, first information, inputted via input device 217, is received. At step 710, first data is associated with the first information, the first data indicating a first event (of the defined events) and a first asset (of the defined assets) to which the first information pertains. At step 712, the first information and, in association therewith, the first data, is transmitted to server 102 via communication network 120 and the first information may be designated for access from server 102 by one or more client devices 104. Similarly, data indicating a first time at which the first information was inputted may also be transmitted to server 102 in association with the first information.

At step 714, second information, inputted via input device 217, is received. At step 716, data is associated with the second information, the data indicating an event (of the defined events) and an asset (of the defined assets) to which the second information pertains. At step 718, the second information is transmitted to server 102 and to one or more client devices 104 via communication network 120. The data associated with the second information, and data indicating a time at which the second information was inputted, may also be transmitted, in association with the second information, to server 102 and to the one or more receiving client devices 104.

It is noted that, in step 718, the transmission of the second information to the one or more client devices 104 may occur in either of the two manners described above with reference to FIGS. 5 and 6. That is, the second information may be transmitted to server 102 and then from server 102 to client devices 104 (i.e., all transmissions between client devices 104 going via server 102), as per FIG. 5, or the second information may be transmitted both to server 102 and directly from client device 104 to the other client device(s) 104, as per FIG. 6 under the noted configuration of crisis management system 100.

Related to step 718, transmission data may be associated with the second information, the transmission data indicating selected ones of client devices 104 to which the second information is designated for transmission. In this case, the second information is transmitted to the selected ones of client devices 104. The transmission data may be inputted via input device 217 of the sending client device 104, e.g., by a user, or may be present in the sending client device 104 by another means, e.g., having been preprogrammed during setup, e.g., based on a defined group of authorized users authorized to perform certain actions with respect to the defined event or asset to which the second information pertains.

At step 720, third information is received from another client device 104 via communication network 120. As per the discussion of step 718 above, the third information received from another client device 104 may be received via server 102, in either of the two manners discussed above. With reference to step 720, data indicating the event and asset to which the third information pertains may be received in association with the third information, and if the first and third events or assets are the same, the first and third information may be associated with each other.

At step 722, fourth information and, in association therewith, second data indicating a second event and a second asset to which the fourth information pertains, is accessed from server 102 via communication network 120. The fourth information and the second data may have been transmitted to server 102 from one of the client devices 104 via communication network 120 and designated for access from server 102 by one or more of the client devices 104. With regard to step 722, more generally, information may be selectively accessed from server 102, for example, based on characteristics/identity of the event or the asset to which the information pertains.

At step 724, the received third information and the accessed fourth information is displayed on display device 219 of the receiving/accessing client device 104.

Transmission of the second information, and reception of the third information, between the sending and receiving client devices 104, and between client device 104 and server 102, may occur via email, text message, or other media. In this regard, transmission between client device 104 and server 102 may occur via a medium different from that used for transmission between sending and receiving client devices 104. With regard to all transmission and reception of information, the information may be encrypted prior to transmission and decrypted upon reception.

When additional information is inputted into client device 104, additional data indicating a defined event and a defined asset to which the additional information pertains may be associated with the additional information. If either the event or the asset to which the additional information pertains is the same as the first event or the first asset to which the first information pertains, the additional information and the first information may be associated together on the basis of the common event or asset. If both the event and the asset to which the additional information pertains are the same as the first event and the first asset to which the first information pertains, the additional information may be deemed an update of the first information. In this case, of course, the time at which the additional information was inputted into client device 104 is later than the time at which the first information was inputted into client device 104. The additional information may be transmitted to server 102, in association with the additional information and the time at which the additional information was inputted into client device 104, and, if appropriate, the additional information may be identified to server 102 by client device 104 as an update of the first information. Relatedly, client device 104 may receive a notification from server 102 when server 102 receives and identifies information as an update of the previously received information. The notification may indicate that an update of previously received information has been made, and may indicate the content of that update.

Client device 104 may also access or receive from server 102 reports generated by software service 116 based on the results of analysis performed by software service 116 on accumulated information received by server 102 from one or more client devices 104.

Steps 708-724 may be performed by management module 422, with steps 708, 710, 714 and 716 being performed by input module 427, steps 712, 718, 720 and 722 being performed by communication/loading module 428, and step 724 being performed by output module 429. These sets of steps may be referred to as the input portion, communication/loading portion, and output portion, respectively, of crisis management method 700.

According to some embodiments, instead of or in addition to steps 702 and 704, one or more items may be defined, each item comprising an event or an asset. Correspondingly, in this case, subsequent steps of method 700 that involve the defining of an event or asset may involve the defining of an item. According to some embodiments, method 700 may include such a step of defining an item, and steps 708-712 and 722, so modified in view of the step of defining an item. According to some embodiments, method 700 may include other subsets of steps 702-724, including other modifications or not. According to some embodiments, the labels such as "first information," "second information," etc. may be used to refer to different kinds of information than those for which those labels were used above.

Turning to FIG. 8, crisis management method 800, as performed by software service 116 on server 102, will be described. In accordance with various embodiments, some or all of the steps of crisis management method 800 may be performed. The order of the steps may be varied.

Steps 802 through 806 correspond to steps 702 through 706, respectively, of crisis management method 700, and the above description of the latter applies to the former, the necessary changes being made given that the latter pertain to client device 104 and the former pertain to server 102. Therefore, for the sake of brevity, further description of steps 802 through 806 with reference to FIG. 8 is omitted, as one of ordinary skill in the art will understand the aforementioned necessary changes being made. Steps 802 through 806 may be performed by setup module 321 of software service 116, and these steps may be referred to collectively as the setup portion of crisis management method 800.

At step 808, first information and, in association with the first information, first data indicating a first event and a first asset to which the first information pertains, are received from a first client device 104 via communication network 120. At step 810, the received first information and, in association therewith, the received first data, is stored in memory 112, e.g., database 118, of server 102.

At step 812, second information and, in association with the second information, second data indicating a second event and a second asset to which the second information pertains, are received from a second client device 104 via communication network 120. At step 814, the received second information and, in association therewith, the received second data, is stored in memory 112, e.g., database 118, of server 102.

Relatedly to steps 808 and 812, data indicating a first time at which the first information was inputted into the first client device 104 may be received from first client device 104, and data indicating a second time at which the second information was inputted into the second client device 104 may be received from second client device 104. Relatedly to steps 810 and 814, the data indicating the first time at which the first information was inputted, and the data indicating the second time at which the second information was inputted, may be stored in the memory 112, e.g., database 118, of server 102, in association with the first and second information, respectively. Further relatedly to step 814, at step 815, if the first and second events, or the first and second assets, are the same, the first and second information are stored in association with each other.

At step 816, third information and, in association with the third information, transmission data indicating selected ones of the client devices 104 to which the third information is designated for transmission, is received from a third client device 104 via communication network 120. At step 816, third data, indicating a third event and a third asset to which the third information pertains, may also be received in association with the third information from a third client device 104 via communication network 120. At step 818, the received third information is stored in memory 112, e.g., database 118, of server 102. At step 818, the transmission data and third data may also be stored in memory 112, e.g., database 118, of server 102.

At step 820, the third information is transmitted to the selected ones of the client devices 104. The reception and transmission of the third information may occur via email, text message, or other media. The reception of the first and second information may occur via email, text message, or by other manner of transmission. With regard to all transmission and reception of information, the information may be encrypted prior to transmission and decrypted upon reception.

At step 822, ones of the client devices 104 are permitted to access the received first, second and third information via communication network 120. Such permitting access may comprise transmitting any of the received first, second and third information to ones of the client devices 104. With regard to step 822, more generally, ones of the client devices 104 may be permitted to selectively access information from server 102, for example, based on characteristics/identity of the event or the asset to which the information pertains.

It is noted that any of the first, second and third client devices 104 may be the same or different devices.

At step 824, fourth information and, in association with the fourth information, fourth data indicating that the fourth information pertains to a given event and a given asset, are received from a fourth client device 104 via communication network 120; in addition, data indicating a second time at which the fourth information was inputted into the fourth client device 104 is received from the fourth client device 104 via communication network 120. At step 826, if either the given event or the given asset to which the fourth information pertains is the same as the first event or the first asset to which the first information pertains, the fourth information and the first information may be associated together on the basis of the common event or asset. At step 828, if both the given event and the given asset to which the fourth information pertains are the same as the first event and the first asset to which the first information pertains, and the second time is later than the first time, the fourth information may be deemed and identified as an update of the first information. At step 830, the received fourth information may be stored in memory 112, e.g., in database 118, as an update of the first information, and in association with the given event and given asset to which the fourth information pertains and with the data indicating the second time at which the fourth information was inputted. At step 832, a notification may be sent to ones of the client devices 104 after identification of the received fourth information as an update of the first information. The notification may indicate that an update of the first information has been made, and may indicate the content of that update, that is, the fourth information. At step 834, ones of the client devices 104 are permitted to access the received first information, the received fourth information identified as an update of the first information, the data indicating the first time at which the first information was inputted, and the data indicating the second time at which the fourth information was inputted. Such permitting access may comprise transmitting the indicated information and data to ones of the client devices 104. The first and fourth client devices 104 may be the same device or different devices.

At step 836, analysis may be performed on the received first and second information, and a report may be generated based on the results of the analysis. At step 838, ones of the client devices 104 may be permitted to access the report. Such permitting access may comprise transmitting the report to ones of the client devices 104.

Steps 808-838 may be performed by management module 322, with steps 808, 812, 816, 820, 822, 824, 832, 834 and 838 being performed by reception/transmission module 323, steps 810, 814, 818 and 830 being performed by storage module 324, steps 815, 826 and 828 being performed by tracking module 325, and step 836 being performed by analysis module 326. These sets of steps may be referred to as the reception/transmission portion, storage portion, tracking portion, and analysis portion, respectively, of crisis management method 800.

According to some embodiments, instead of or in addition to steps 802 and 804, one or more items may be defined, each item comprising an event or an asset. Correspondingly, in this case, subsequent steps of method 800 that involve the defining of an event or asset may involve the defining of an item. According to some embodiments, method 800 may include the following steps: defining one or more items, each item comprising an event or an asset; receiving, from a first one of the client devices via the communication network, first information and, in association with the first information, first data indicating a first item to which the first information pertains; storing the received first information and, in association therewith, the received first data in the memory; and permitting ones of the client devices to access the received first information via the communication network. According to some embodiments, method 800 may include other subsets of steps 802-838, including modifications of those steps or not. According to some embodiments, the labels such as "first information," "second information," etc. may be used to refer to different kinds of information than those for which those labels were used above.

A more detailed description of crisis management methods 700 and 800 will now be described with reference to FIGS. 9-24.

FIGS. 9-24 pertain to an example organization faced with the task of recovering from one or more disasters. As an example, the organization generally illustrated in these figures is a university with multiple campus locations and multiple buildings. Embodiments of the present invention are applicable to a variety of organizations or entities, e.g., corporate entities having multiple retail outlets, branch offices, production facilities, or other assets, e.g., properties or buildings/structures, etc. The assets may be grouped into divisions, which may correspond to cities or other geographical regions. Such corporate entities may be private, commercial entities, government entities, non-profit entities, etc. The assets may be physical structures or territories (e.g., parks, real estate lots, mountains (e.g., for skiing), etc.), personnel, or abstract entities such as organizational units. Each asset may be unique to a given location, in which case the assets may be referred to as locations. The assets may be subject to damage, closure, devaluation, incapacitation, etc. due to disasters or other conditions.

FIGS. 9-24 show screenshots on a client device 104, and hence are described with respect to actions of a user of client device 104 and operations of crisis management method 700 performed by software application 216. With respect to some of those actions and operations, corresponding operations are performed by software service 116 residing on server 102. To the extent not described above or below, such corresponding operations will be understood by one of ordinary skill in the art.

Figure 9:
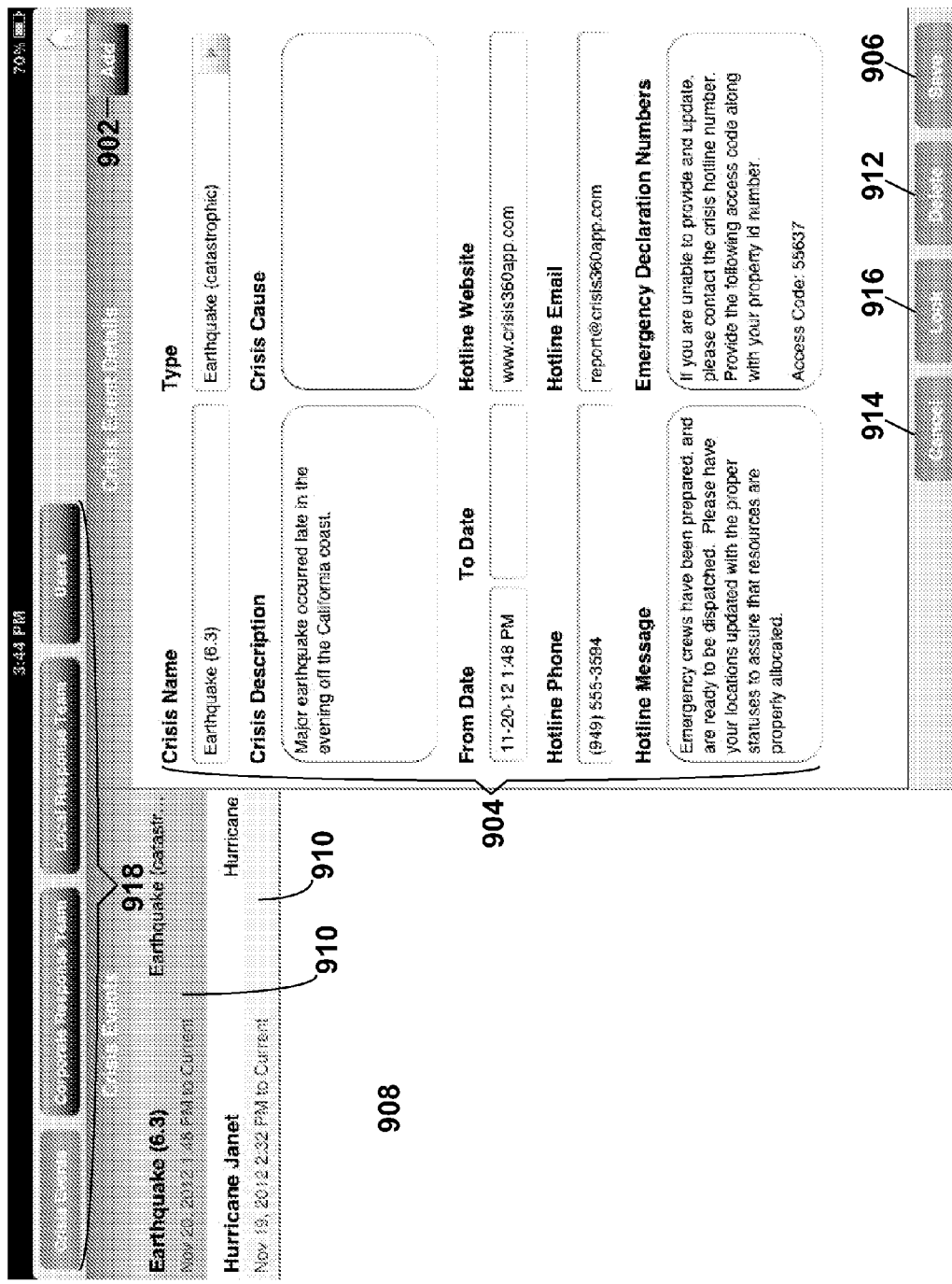
FIG. 9 is a screenshot of a setup screen for defining crisis events, in accordance with some embodiments.
Figure 10:
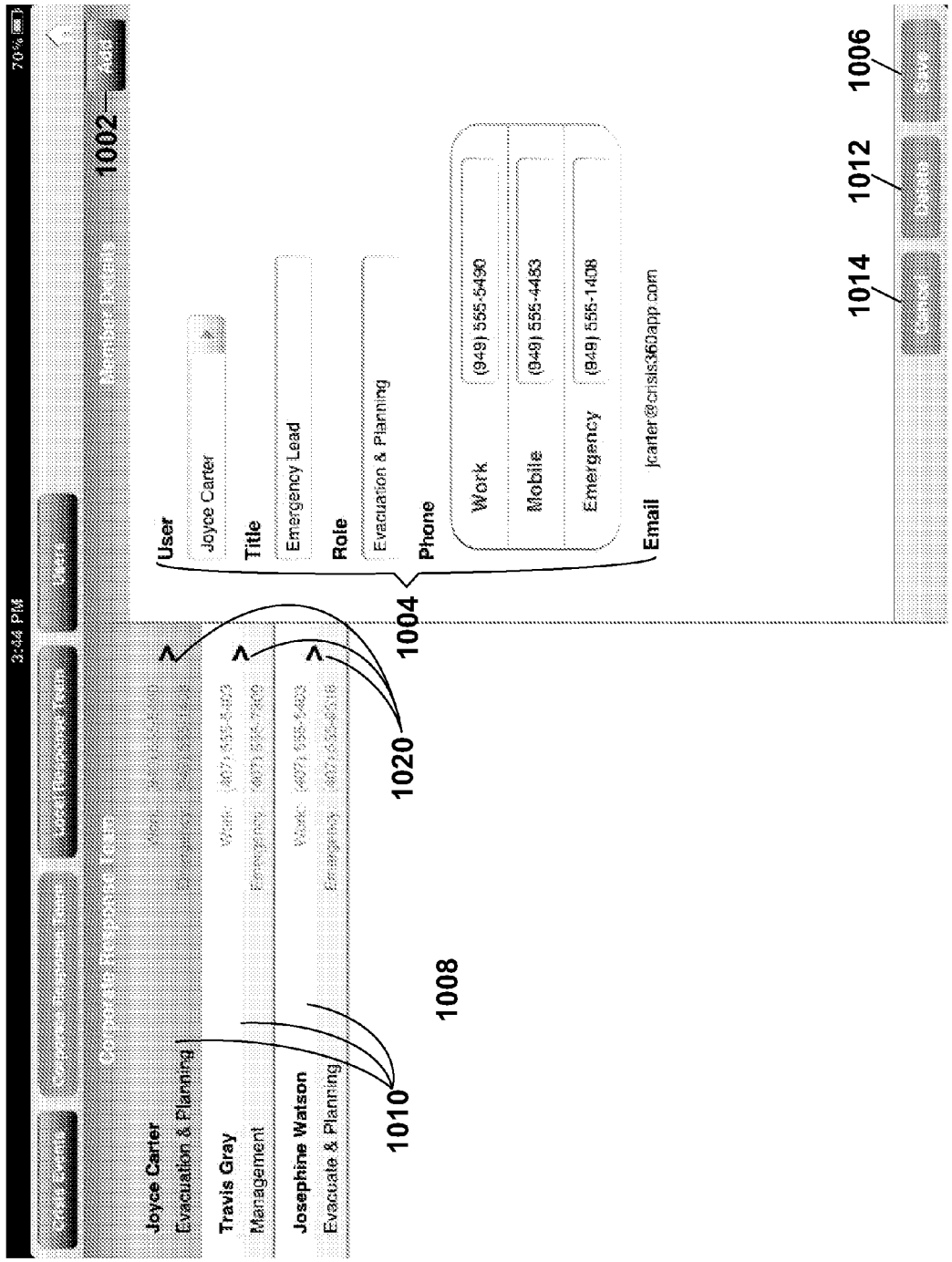
FIG. 10 is a screenshot of a setup screen for defining a corporate response team, in accordance with some embodiments.
Figure 11:
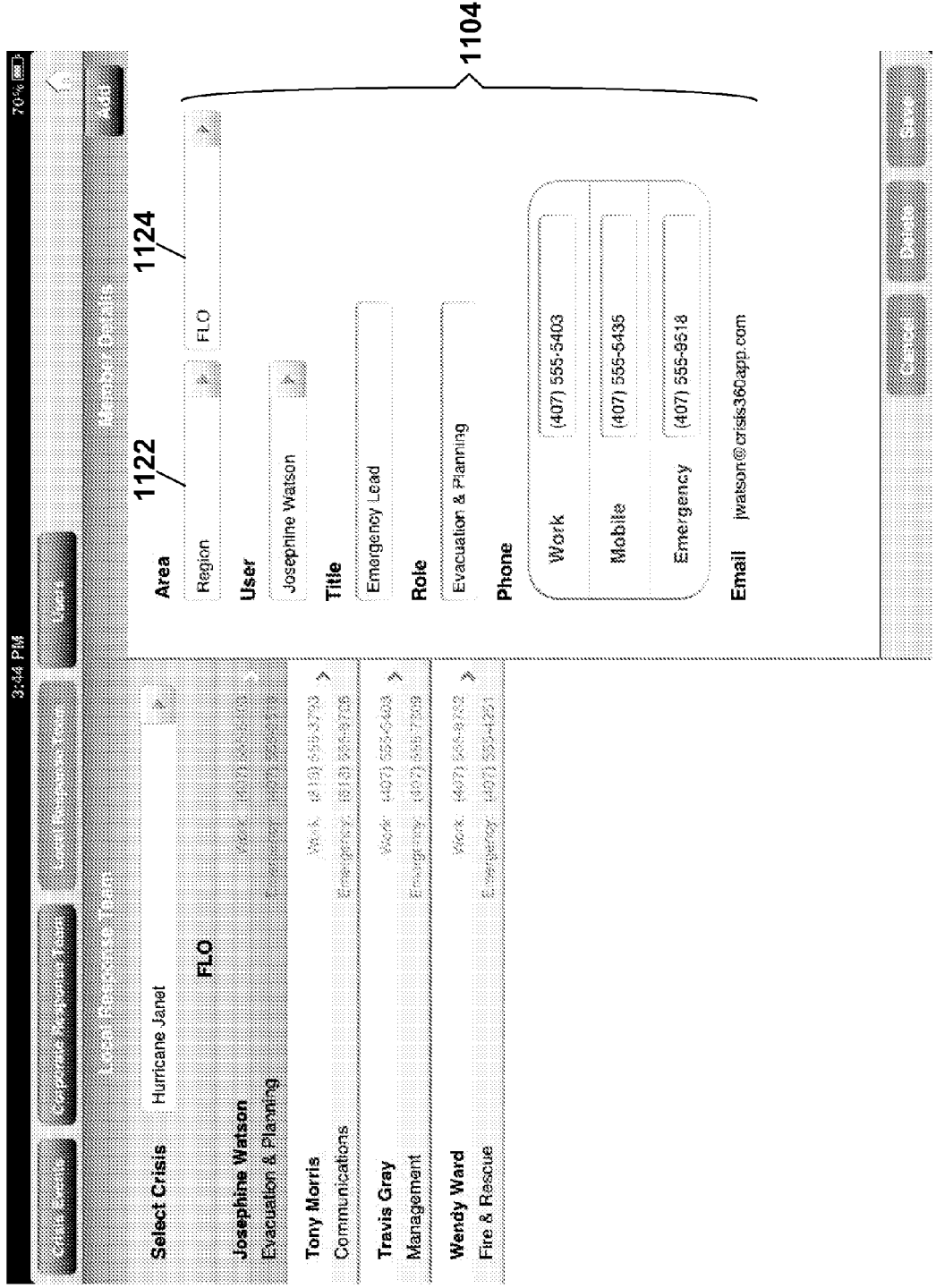
FIG. 11 is a screenshot of a setup screen for defining a local response team, in accordance with some embodiments.
Figure 12:
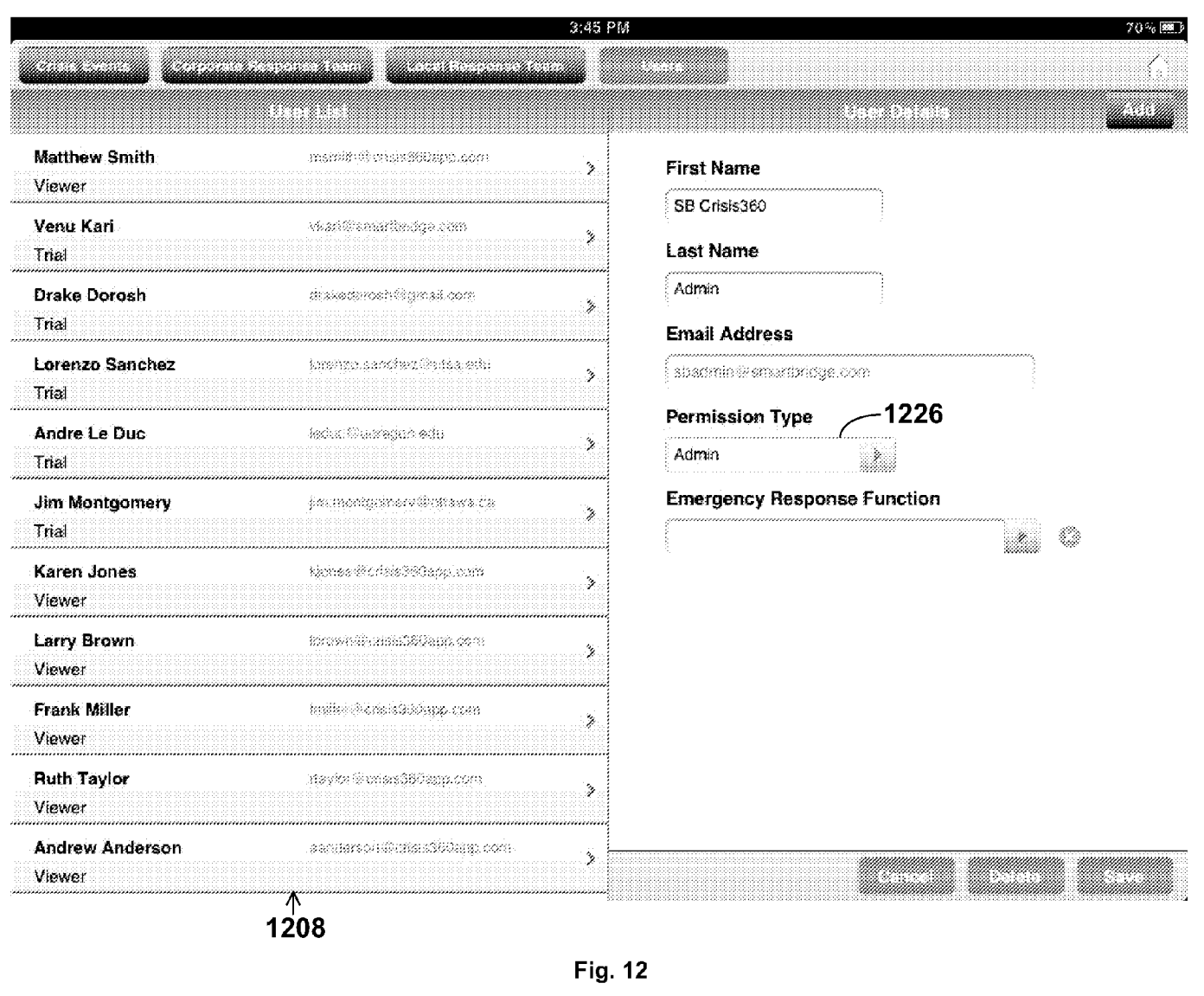

The setup portion of crisis management methods 700, 800 will be described with reference to FIGS. 9-12. FIG. 9 is a screenshot of a setup screen for defining crisis events, in accordance with some embodiments. FIG. 10 is a screenshot of a setup screen for defining a corporate response team, in accordance with some embodiments. FIG. 11 is a screenshot of a setup screen for defining a local response team, in accordance with some embodiments. FIG. 12 is a screenshot of a setup screen for defining authorized users, in accordance with some embodiments. The functions performed using the screens shown in FIGS. 9-12 may be performed by inputting information into a client device 104, for subsequent upload/transmission to server 102.

The screen shown in FIG. 9 may be used to define or create events, e.g., crisis events. A user can define or create a new event by pressing the "add" button/icon 902. Pressing the "add" button (or icon) 902 brings up several fields 904 for entering information defining the event. As shown in FIG. 9, fields 904 may include "crisis name," "crisis type," "crisis description," "crisis cause," "from date," "to date," "hotline website," "hotline phone number," "hotline email address" "hotline message," and "emergency declaration numbers." Filling in fields 904 and pressing the "save" button 906 completes the defining of the event. The defined events are listed in a vertical sidebar 908 (although only two events are shown in sidebar 908, more than two events may be defined and listed). Each listed event 910 includes brief information identifying the event, namely, event name, event type, from date and to date. Selecting one of the listed events 910 by highlighting it (as shown for "Earthquake (6.3)") brings up the information entry fields 904 for the selected event, which then may be edited. A listed event 910 may be deleted by selecting it from the list in sidebar 908 and pressing the "delete" button 912. The "cancel" button 914 may be used to cancel an action (e.g. saving or deleting) rather than completing it. The "lock" button 916 permits a user to lock a listed event 910 and the information in fields 904 describing it, so that no other user can delete the event 910 or edit the information. If not locked, a user may edit the information by selecting the event 910, overwriting the existing information and pressing "save" button 906. Once an event 910 is locked, the "lock" button 916 may change to an "unlock" button (not shown), which permits a user to unlock the event 910 and the information describing it, e.g., in order to edit the information or delete the event 910. The system may be configured such that locking and/or unlocking may be performed only by users having the requisite authorization to do so. Although not illustrated, the system may be configured to permit locking and unlocking of entities other than events, e.g., assets, users, etc.

A user can navigate back and forth among various setup screens by selecting and pressing any one of the icons 918, namely, "crisis events," "corporate response team," "local response team," and "users." Although not illustrated, according to some embodiments the screen shown in FIG. 9 may include among icons 918 an additional icon labeled "assets" for defining assets, or an asset setup function may be accessed in a different manner. In either case, a screen for defining or creating assets may be provided, which may have a format/layout and capabilities for adding, deleting, editing, locking, etc. along the lines of those of the setup screen for defining events shown in FIG. 9. Crisis management system 100 may also be integrated with enterprise resource planning (ERP) software so as to obtain asset information therefrom such that assets may be automatically defined in the system rather than requiring them to be manually entered.

The screen shown in FIG. 10 may be used to define members of a central authority/unit, who may be in charge of individual users or groups of individual users; in this example, the central authority/unit is referred to as a corporate response team, which is in charge of local response teams, each of which is responsible for a given asset/location. The "add" button 1002, "delete" button 1012, "save" button 1006, and "cancel" button 1014, as well as the information entry fields 1004, shown in FIG. 10 are operated by a user in a manner similar to their counterparts in FIG. 9, and are used to add or delete members of the team, and to input, delete or edit information about a given member. Also, vertical sidebar 1008, which includes a list of defined members, each list entry including brief identifying information such as name, role and phone numbers, operates similarly to vertical sidebar 908, which includes a list of defined events, shown in FIG. 9. In accordance with some embodiments, a user may initiate a phone call or (although not illustrated in FIG. 10) an email to a listed member 1010 directly from the member list, by pressing an icon, such as arrowhead 1020, on the listing for the individual member.

The screen shown in FIG. 11 may be used to define members of a local response team which may be responsible for a given asset/location. This screen operates in a manner similar to that of FIG. 10. FIG. 11 shows a field 1122 labeled "area," which does not have a counterpart in FIG. 10. Field 1122 may represent a unit of the organization or corporate entity intermediate in hierarchy between the central authority and the assets/local response teams, that is, each area (or division, etc.) may encompass some of the assets/local response teams. Adjacent to "area" field 1122 is an unlabeled field 1124 that may represent, e.g., a sub-area (sub-division), or an asset/location. In this regard, it may be noted that although only three such levels of hierarchy (corporate, i.e., central authority; area or division; and building, i.e., asset) are generally illustrated herein (see, e.g., FIG. 19), crisis management system 100 may be customized to have a greater or lesser number of levels of hierarchy.

The screen shown in FIG. 12 may be used to define all users of the system. This screen operates in a manner similar to that of FIGS. 10 and 11. Defining (adding and saving) a user may be understood as authorizing the user. Crisis management system 100 may be configured so that users may be selectively authorized, e.g., to perform selected functions, to perform functions with respect to selected assets, etc. Such selective authorization may be performed by assigning a user to a permission type or user group. As seen in FIG. 12, "permission type" is an information entry field 1226 to be filled in (in this case, by selecting from a pull-down menu rather than entering text freeform) when adding a new user or editing a user's information. As seen in the user list in vertical sidebar 1208 and in the user details for a given user being added, permission types (or user groups) in this example include "viewer," "trial (user)," and "admin." Other permission types that might be employed could include "crisis responder" and "executive," etc. For example, a crisis responder may be authorized to perform some or all of the following: input information (e.g., status updates and the like), send messages, receive messages, and access information regarding the asset to which s/he is assigned as a member of the local response team responsible for that asset; in contrast, a viewer may be someone who is not a member of any local response team and may accordingly be authorized to access information from the server to view it but not to input information regarding assets. As another example, executives and/or admin users but not other users could be authorized to lock and/or unlock events or other items.

It will be understood that other ones of information entry fields 1004, 1104, e.g., title, role, and area (division), as shown in FIGS. 10 and 11, could also be used to implement selective authorization. The system could be configured, for example, such that a given title or role corresponds to a given permission type or user group, such that assigning a user a given title or role automatically assigns that user to a given user group (for example, the role "customer relationship manager" could correspond to the "viewer" user group). Alternatively, for example, assigning a user a given title or role could serve to directly implement selective authorization for that user, i.e., authorize that user to perform certain functions. As another example, assigning a user to a given area (division) may serve to selectively authorize that user, e.g., to perform certain functions with respect to assets in that area (division) but not with respect to assets in other areas (divisions).

As was described with respect to defining assets, integration of crisis management system 100 with enterprise resource planning (ERP) software may also be used to access personnel information such that personnel (e.g., corporate response team, local response team, users) may be automatically defined in the system rather than requiring them to be manually entered.

It should also be understood, with respect to FIGS. 9-12 as well as the other examples of screenshots illustrated in this disclosure, the specific information entry fields, the layout/formatting of the screen, the specific icons/buttons and tabs, etc. may be varied, including by addition and omission of items, such that the system can be customized to different requirements, as may be warranted for different purposes, e.g., different types of organizations, assets, events, etc.

Figure 13:
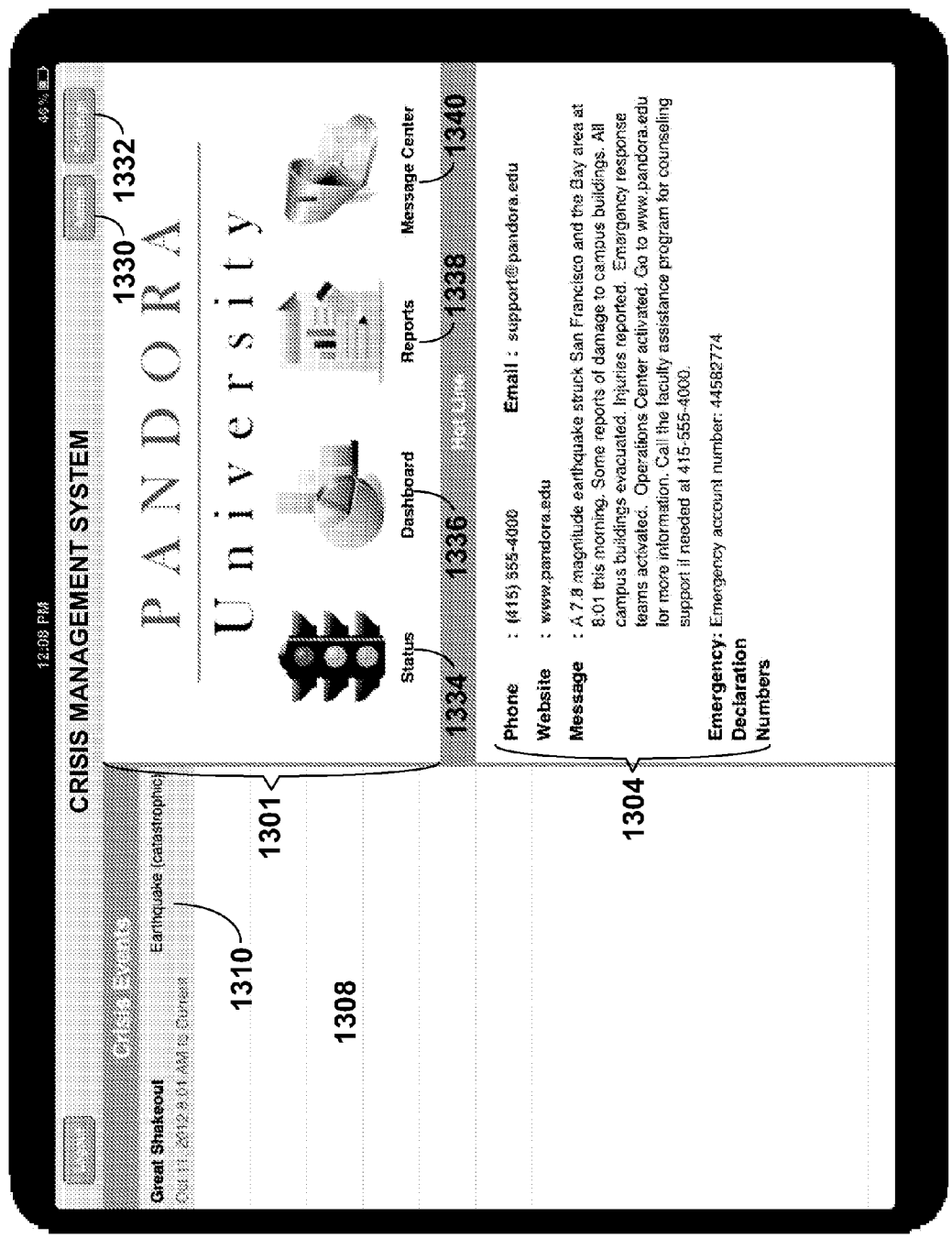
FIG. 13 is a screenshot of a home screen for a client device, in accordance with some embodiments.
Figure 14:
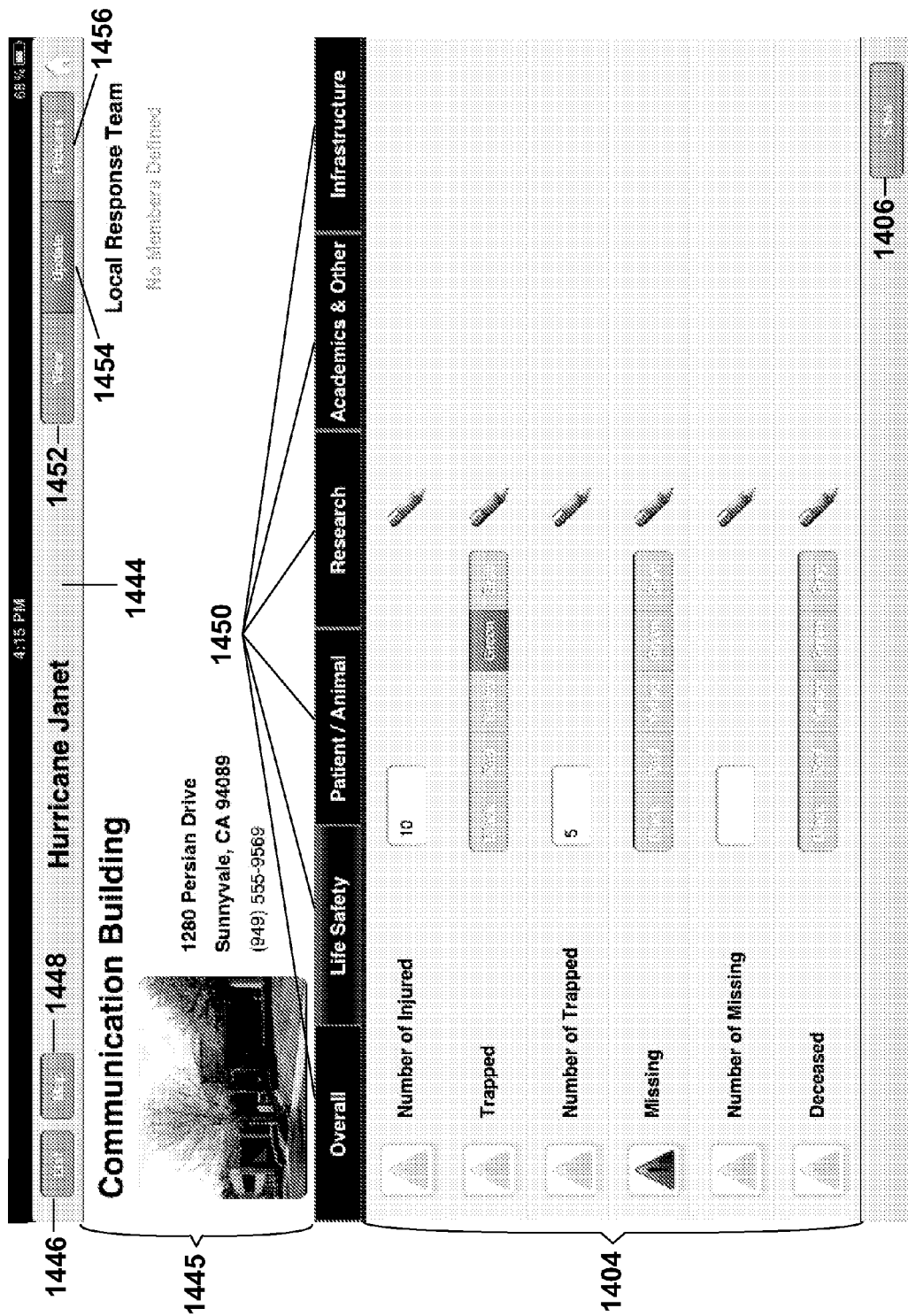
FIG. 14 is a screenshot of an update screen for updating status information of an asset, in accordance with some embodiments.
Figure 16:
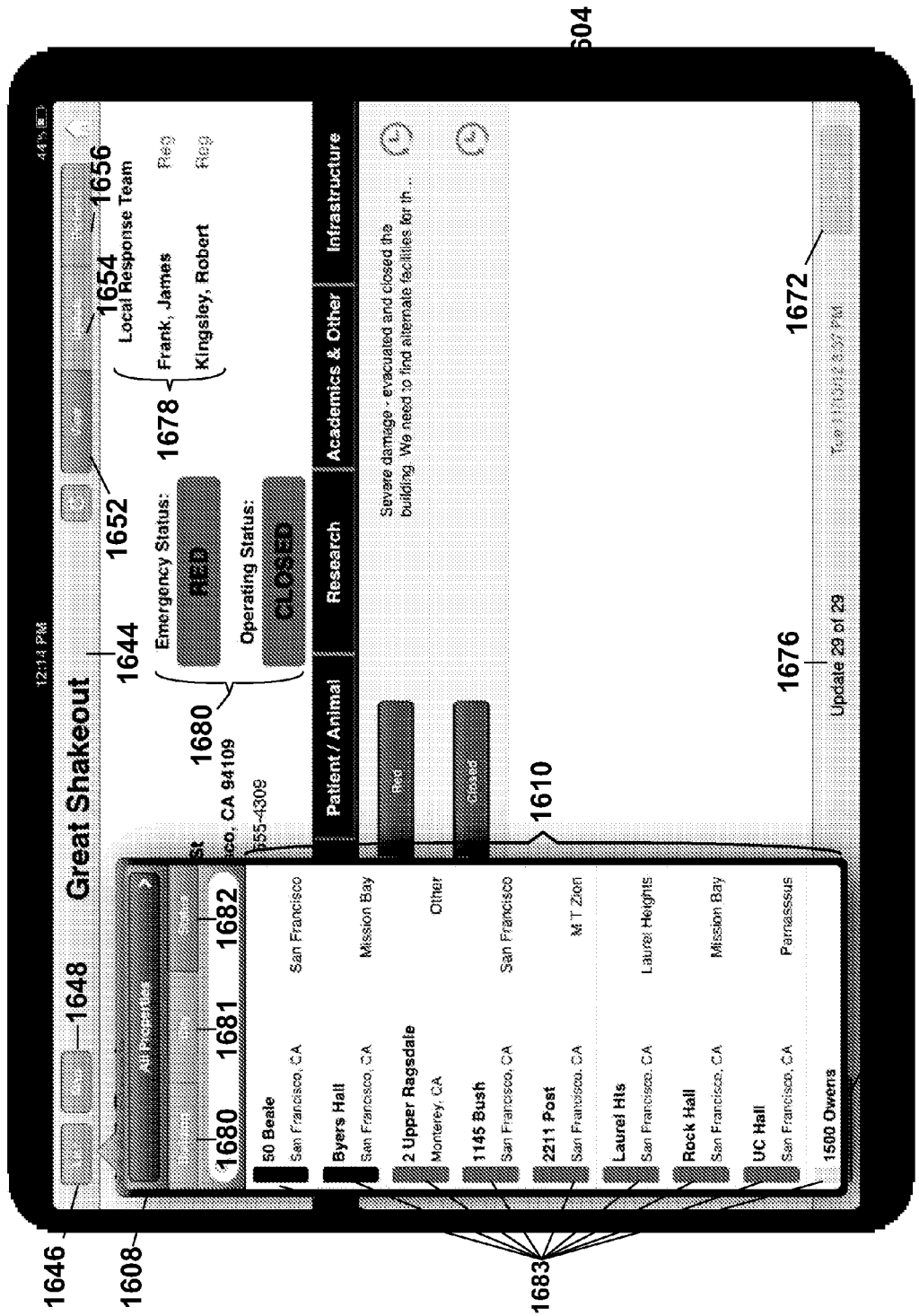
FIG. 16 is a screenshot of a view status screen for viewing status information of assets, in accordance with some embodiments.
Figure 17A:
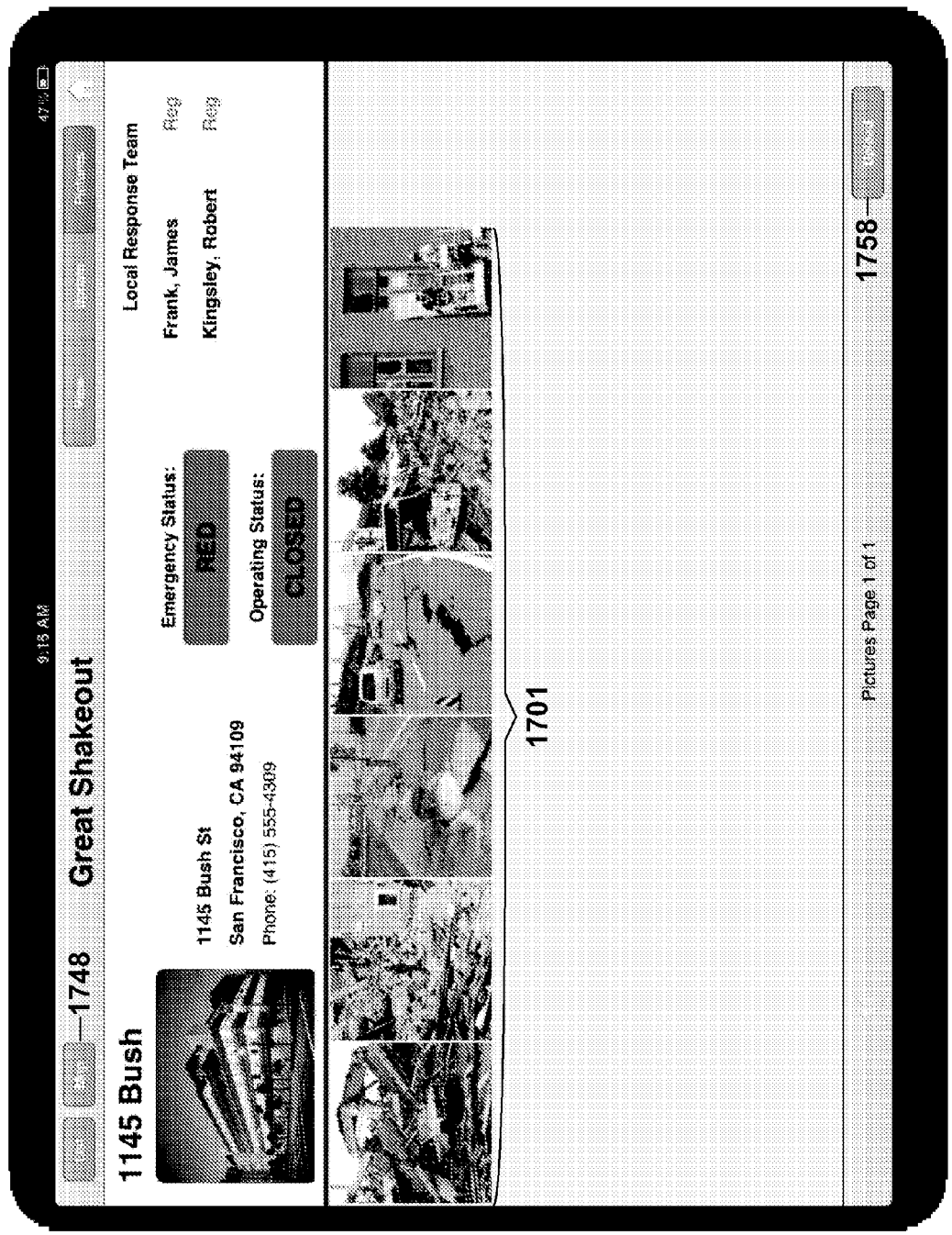
FIGS. 17A and 17B are screenshots of pictures screens for viewing pictures of assets, in accordance with some embodiments.

FIG. 13 is a screenshot of a home screen for a user of client device 104 to navigate through the various screens provided by the system for carrying out operations of the methods. The vertical sidebar 1308 at left shows a list of all the events 1310 entered (defined) in the system, e.g., an earthquake (Great Shakeout) (although only one event is shown in sidebar 1308, more than one event may be defined and listed). When a given event is highlighted, brief identifying information (e.g., phone number, email address, website, message, emergency declaration numbers) about the event appears in information entry fields 1304. The home screen also includes a navigation menu 1301, Admin button 1330 and Settings button 1332. Selecting Admin button 1330 takes the user to the set of Admin screens, namely, those illustrated in FIGS. 9-12 and described above. Selecting Settings button 1332 opens a popup window where the user may view and edit settings, illustrated in FIG. 24 and described below. Navigation menu 1301 includes a Status icon 1334, a Dashboard icon 1336, a Reports icon 1338 and a Message Center icon 1340. Selecting Status icon 1334 takes the user to one of a set of screens for the highlighted event, covering all the assets defined (or all the assets defined as pertaining to that event), for inputting and viewing information about those assets, pertaining to that event, as illustrated in FIGS. 14, 16 and 17A, described below. Selecting Dashboard icon 1336 takes the user to the dashboard screen, illustrated in FIG. 20A, described below. Selecting Reports icon 1338 takes the user to the reports screen, illustrated in FIG. 19, described below. Selecting Message Center icon 1340 takes the user to the message center screen, illustrated in FIG. 21, described below. The system may be configured such that selecting a given one of the events 1310 listed in sidebar 1308 again takes the user to one of a set of screens for that event, covering all the assets defined (or all the assets defined as pertaining to that event), for inputting and viewing information about those assets, pertaining to that event, as illustrated in FIGS. 14 and 16 and 17A, described immediately below.

Figure 15:
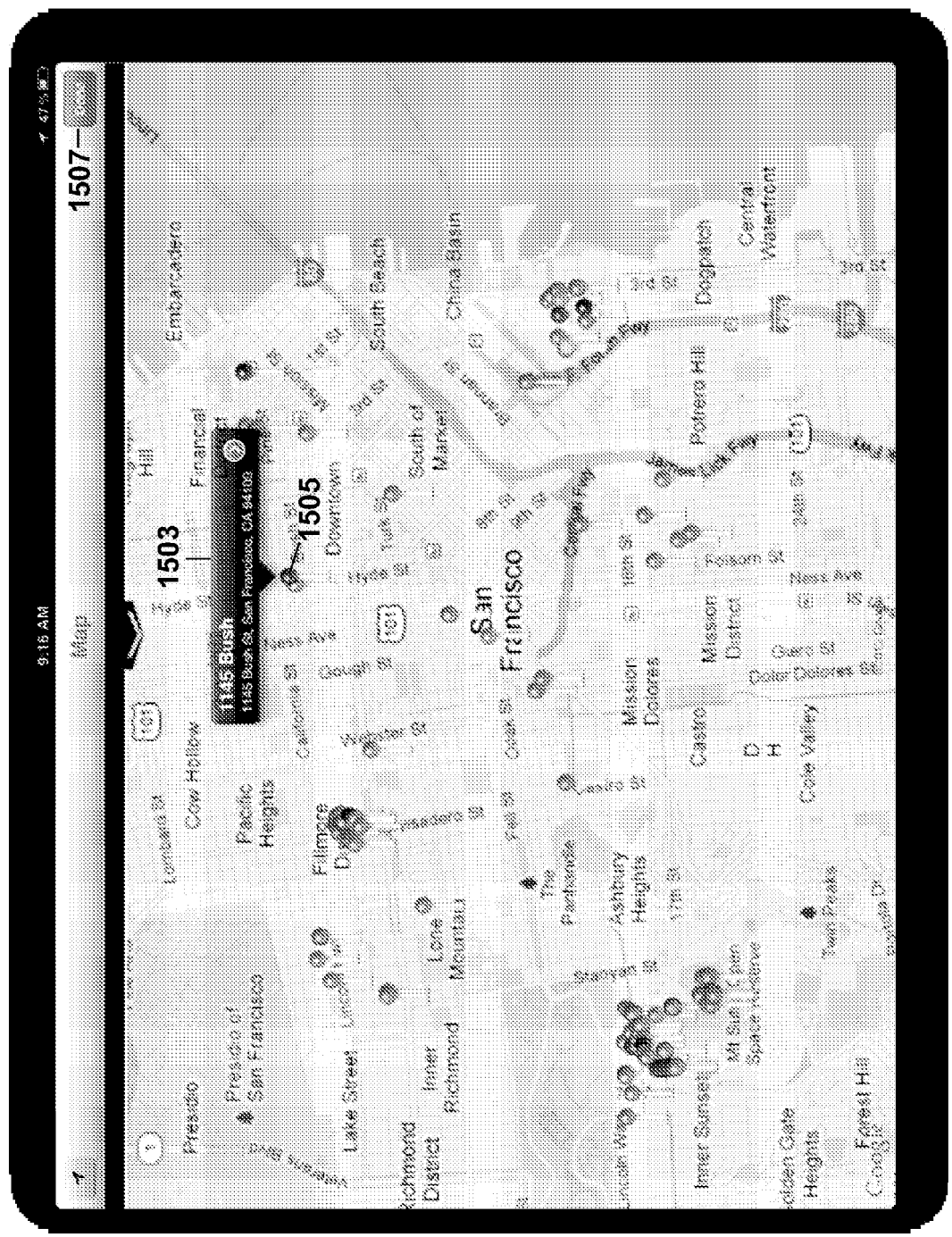
FIG. 15 is a screenshot of a map view of assets, in accordance with some embodiments.
Figure 18:
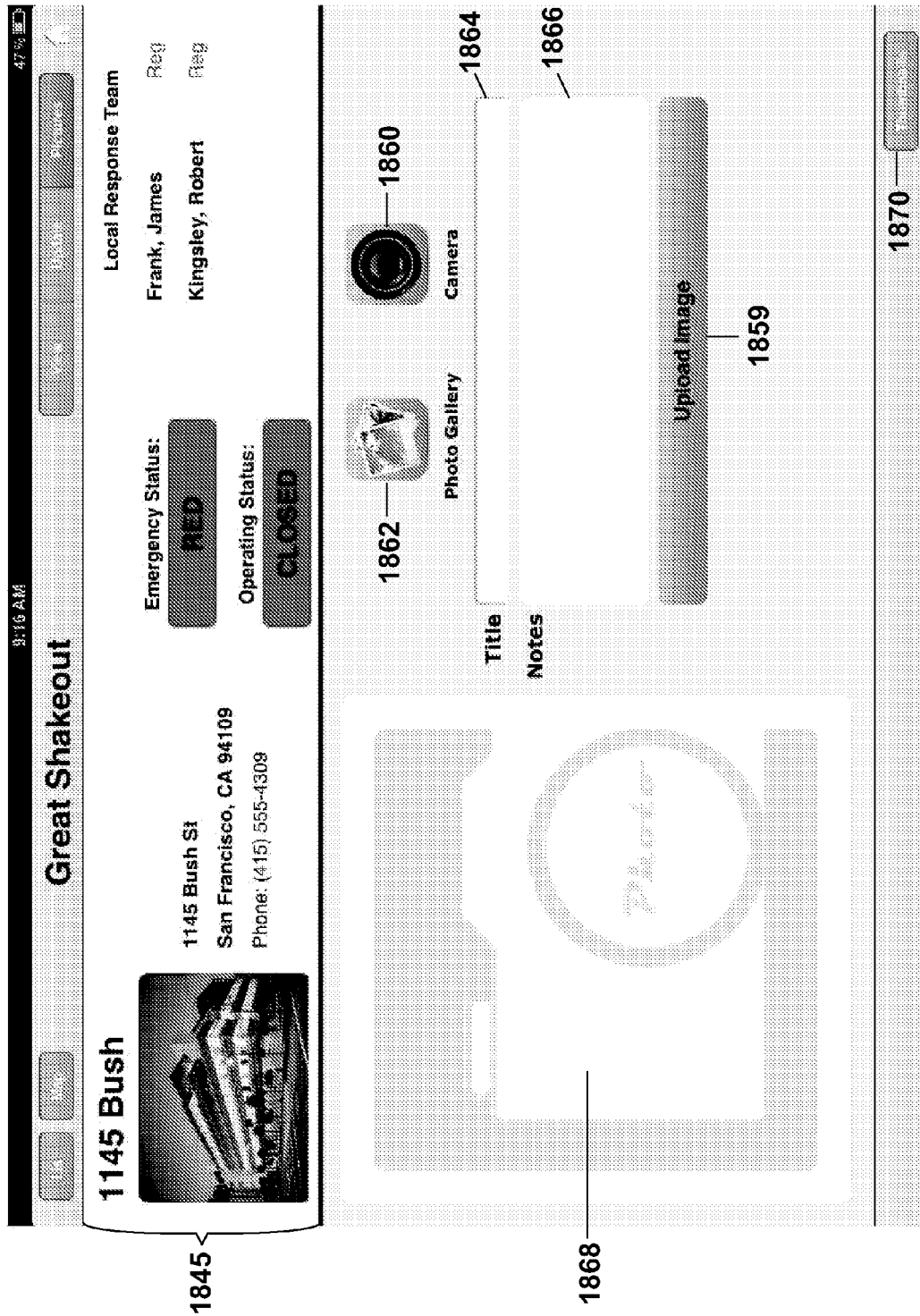
FIG. 18 is a screenshot of an upload image screen for uploading images of assets, in accordance with some embodiments.

The input portion of crisis management method 700 will be described here with reference to FIG. 14 and below with reference to FIG. 18. FIG. 15 will also be described in the course of this description. FIG. 14 is a screenshot of an update screen for updating status information of an asset, by inputting information into a client device 104, for subsequent upload/transmission to server 102, in accordance with some embodiments. As shown, update button 1454 is highlighted/selected, indicating this screen is an update screen. As shown in event name field 1444, this is a screen pertaining to the event "Hurricane Janet." As shown in asset field 1445, the update screen currently shows information pertaining to the asset "Communication Building." Asset filed 1445 may include not only the name of the asset but identifying information, e.g., a photograph, address/location, phone number, as illustrated. The List button 1446 and Map button 1448 permit viewing of the assets in a sidebar list view (illustrated in FIG. 16 as element 1608, described below) or in a map view, as illustrated in FIG. 15.

FIG. 15 is a screenshot of a map view of assets, in accordance with some embodiments. The system may be configured to show identifying information 1503 for the particular asset 1505 which was shown in FIG. 14 (or FIG. 16 or 17A) when the user pressed the map button 1448 (or 1648 or 1748) to go to the map view shown in FIG. 15. The system may also be configured to show this identifying information 1503 when the user selects, in some fashion, an asset shown in the map view. In the map view, all the assets or different subsets of the assets, for example, only those assets for which status information has been reported, may be viewed. Other kinds of filtering (viewing a select subset) of the assets shown on the map, such as by asset type, or by organizational hierarchy such as by region, location, zip code, etc. may be provided. Crisis management system 100 may be configured so as to permit a user to customize such filter conditions. Although not illustrated in FIG. 15, in the map view different information about the assets may be shown, e.g., the overall status or the operating status. The map view may also show entities other than assets, for example, emergency services and places of public interest such as medical facilities, restaurants, banks, gas stations, and roads; such entities may be shown using symbols or icons that are the same as, or different from, those used to show assets. The status of such places could be obtained via external systems via cloud sourcing, and shown on the map. Crisis management system 100 may also be configured such that a user can click on an asset on the map to go to a screen for viewing or updating status information for that asset. Otherwise, when a user hits the done button 1507 s/he is returned to the update screen of FIG. 14.

With continued reference to the update screen shown in FIG. 14, information entry fields 1404, containing status information for the asset indicated in asset field 1445, may be shown for a given one of several categories 1450 by selecting/highlighting the given category. For example, as illustrated, the screen shows information entry fields 1404 in the category of "Life Safety." The set of information entry fields 1404 may vary, or not, for each of categories 1450, as appropriate. Information entry fields 1404 may be edited by inputting the information as illustrated, e.g., in freeform text or otherwise, depending on the individual field. Hitting the Save button 1406 may cause the inputted information to be uploaded/transmitted to server 102 as a status update for the given asset indicated in asset field 1445. Using List button 1446, a user can select an asset from the sidebar list view (as noted, illustrated in FIG. 16 as element 1608, and described below) to update the status for that asset, and more specifically can select categories 1450 ("Overall," "Life Safety," "Patient/Animal," etc.) from the tabs shown with the names of the categories 1450 to update status information in the selected category for the selected asset. The Crisis Management System 100 provides the flexibility to allow a user to configure any field 1404 for which information is desired to be captured (e.g., create a new field 1404) and the ability to organize fields 1404 falling under a given category tab, dynamically without requiring programming changes. Each field 1404 can be configured to allow entry of associated notes (not shown) to be inputted by the user.

As for inputting information in client device 104, in the screen of FIG. 14 or as described elsewhere in this disclosure, crisis management system 100 may be configured such that a user can input textual or linguistic information not only by entering written information or manually selecting from a pull-down menu, radio buttons or the like, but also by means of speech. That is, crisis management system 100 may include speech processing capabilities to accept spoken information from a user, as well as synthesized speech capabilities to instruct or respond to (input of) a user. Information inputted as speech may be referred to herein as audio information. Crisis management system 100 could also be configured such that client device 104 could receive (record) as status information audio information other than speech.

In addition to update button 1454, the screen of FIG. 14 also includes View button 1452 and Pictures button 1456. Selecting Pictures button 1456 takes the user to the screen illustrated in FIG. 17A (described below). The screen of FIG. 17A includes an Upload button 1758. Selecting the Upload button 1758 takes the user to the screen in FIG. 18 where, instead of inputting status information in the form of text (or speech) information as in the update screen of FIG. 14, the user may input status information in the form of image (or video) information, e.g., a photograph (or video) of or pertaining to the asset identified in asset field 1845, reflecting its status as pertaining to the event at issue. By pressing Upload Image button 1859, the inputted image (or video) information is uploaded/transmitted to server 102 for access by other users (described below). With the Camera icon 1860, a user may use client device 104 to take a photograph or video and then directly and immediately input the photograph or video for uploading to the server, such that the photograph or video will appear in the pictures screen (FIG. 17A, described below) as status information for an asset, all of which may be performed while the user is effectively operating within software application 216. Other users of the system may then view the photograph or video immediately thereafter, almost as soon as the photograph or video has been taken (described below). If communication network 120 is down when image/video is captured by a user for uploading to server 102, the image/video may be (e.g., stored in storage 213 and then) automatically uploaded when communication network 120 becomes operational. Images/video need not be inputted solely by the user capturing the image/video at the moment via client device 104, but may also be inputted from another source, e.g., by clicking the Photo Gallery icon 1862, the user may access a Photo Gallery of images/videos already stored on client device 104, e.g., on a hard disk on client device 104, from which images/video may be selected for inputting (and subsequent uploading to server). As indicated by the Title field 1864 and Notes field 1866, users may also annotate image/video information with textual/linguistic description, which may be saved, and thus viewed, with the image/video information. An image/video to be inputted may be previewed in the photo preview box 1868. As described below with respect to the screen of FIG. 16, the user selects an asset from the sidebar list view (element 1608 in FIG. 16) to input image/video information pertaining to that asset. Crisis management system 100 may be configured, along the lines illustrated in FIG. 14, so that the user selects a tab indicating a category 1450 to input image/video information pertaining to that category for the selected asset. Hitting the Thumbnails button 1870 takes the user to the pictures screen of FIG. 17A. FIG. 17A will be described later.

The term "status information" or the like is intended to encompass status information in the form of textual or linguistic information, speech or audio information, and image/video status information.

As described above with reference to FIGS. 14 and 18, when status information is inputted into client device 104, it is associated with a given asset and a given event (the user first selects an event and an asset and inputs the status information as pertaining to the selected event and asset). In this way, information is organized according to event and asset. All information about a given event, about a given asset, and about a given asset with respect to a given event, may be associated with the respective event/asset/asset with respect to event. In this regard, for example, every asset may be assigned a unique identifier, and all information inputted about that asset may be associated with that identifier. Thus, various attributes, e.g., as represented by the category tabs, or the information fields associated therewith, in FIG. 14, of each asset may be kept track of.

In addition, the date/time at which status information is inputted to client device 104 (or uploaded to server 102) may be recorded and associated with the status information inputted. Thus, any input of status information may be deemed an update of status information pertaining to a given asset as of a given time. Each status update received by server 102 may be recorded as a separate record in order to avoid having conflicting versions of information pertaining to the same asset/event/time.

Crisis management system 100 may be configured such that, whenever server 102 receives updated status information about an asset (i.e., whenever the status of an attribute of an asset changes), software service 116 automatically sends alerts to client devices 104 notifying them that an update has been made and/or of the content of the update. Such alerts may be sent to selected groups of client devices 104, e.g., to those users on the local response team responsible for the asset to which the update pertains and to the corporate response team.

As described below, not only status information as discussed with reference to FIGS. 14 and 18, but also messages (when inputted) may likewise be associated with a given asset and given event. Hence, messages may also be organized according to event and asset. Likewise, the date/time at which a message is inputted to client device 104 or sent may be recorded and associated with the message.

Accordingly, as described below, users can easily view and navigate through all status information and/or all messages pertaining to a given asset, and users can easily view and navigate through, e.g., in chronological order or reverse chronological order, a complete history or archive of all status updates and/or messages pertaining to a given asset.

The portions of crisis management methods 700, 800 pertaining to the accessing or viewing of inputted status information will be described with reference to FIGS. 16, 17A, 17B, and 19 (FIG. 15, also pertinent to this discussion, has already been described above). FIG. 16 is a screenshot of a View (view status) screen for viewing status information of assets, in accordance with some embodiments. The screen shown in FIG. 16 is similar to that of FIG. 14, and the former may be navigated to from the latter by selecting the View button 1452 in FIG. 14. Whereas the screen of FIG. 14 was for inputting information, that of FIG. 16 is for viewing information already inputted. Accordingly, the information fields 1604 shown in FIG. 16 are not for entering information as in FIG. 14 but rather for viewing information already entered. Consequently, the screen of FIG. 16 does not have Save" and Cancel buttons. Instead, the screen of FIG. 16 has a Current button 1672 and a History button 1674 (partly hidden behind vertical sidebar popup window 1608). Between the Current button 1672 and History button 1674 is information indicating the time and date at which the status information shown above (in information fields 1604) was inputted (or received by server 102). Also shown is an update identification field 1676 indicating which update the information shown pertains to; "Update 29 of 29" indicates that the information shown represents the chronologically last (most recent), or twenty-ninth of twenty-nine updates pertaining to this asset for this event that have been inputted and are stored by the system. Using the screen of FIG. 16, a user can easily navigate through all the updates pertaining to a given asset for a given event by selecting the current button 1672 and the history button 1674 (which could also be rendered as "next" and "previous" buttons, forward and backward arrows, etc.) to move forward or backward in time ("first" and "last" buttons could also be provided to move to the first and last update). Crisis management system 100 may also be configured to provide a timeline of information of multiple status updates so as to show a greater amount of history on a single screen and thus reduce the need to navigate to different screens in order to see statuses at different times. The screen of FIG. 16 also includes a local response team field 1678 which shows the local response team members responsible for the selected asset, and a statuses field 1680, which shows the emergency and operating statuses of the selected asset. These statuses may be provided in FIG. 14 as information entry fields 1404, e.g., under the "Overall" tab.

As also seen in FIG. 16, the List button 1646 has been selected, causing a popup window to open, which contains a vertical sidebar 1608. The sidebar 1608 lists the assets 1610 associated with the selected event (Great Shakeout), shown in the event name field 1644. By selecting one of the three sidebar tabs at top left, namely, Building tab 1680, City tab 1681, and Status tab 1682, the assets 1610 are caused to be listed in different sequences. For example, when the Status tab 1682 is selected, the assets 1610 are sorted according to their statuses, as indicated by the color-coded status bubbles (rectangles) 1683 associated with the assets 1610, respectively (note: as FIG. 16 is in black and white, the different colors of the bubbles 1683 appear as different shades of grey). The map view, accessed by selecting the Map button 1648, has already been described above with reference to FIG. 15. Of course, selecting the Update button 1654 takes the user to the screen shown in FIG. 14, and selecting the Pictures button 1656 takes the user to the screen shown in FIG. 17A. The remainder of FIG. 16 has been described above with respect to FIG. 14.

Figure 17B:
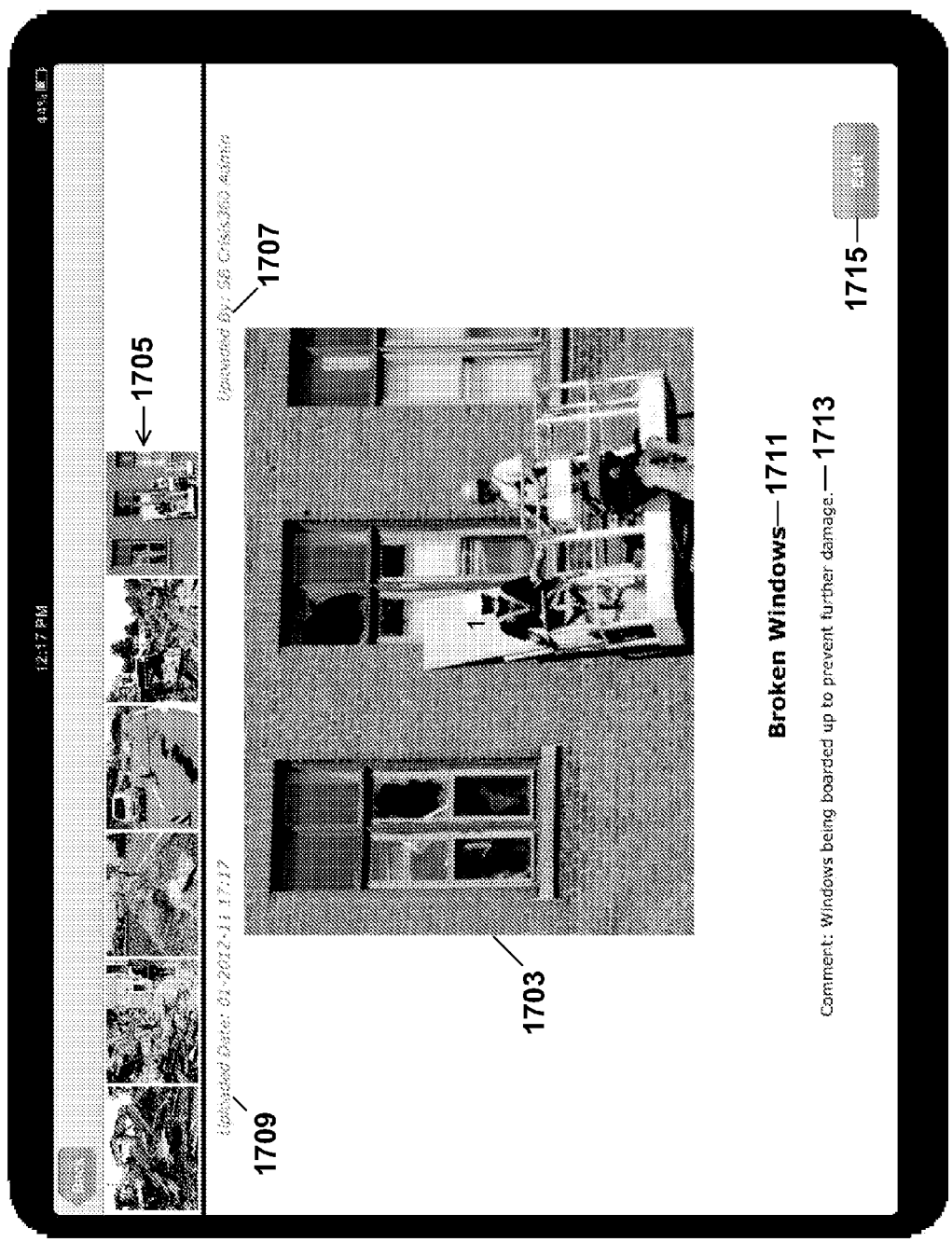

FIGS. 17A and 17B are screenshots of pictures screens for viewing pictures of assets, in accordance with some embodiments. The screen of FIG. 17A thus shows status information comprising photographs 1701 pertaining to the selected asset (1145 Bush) and the selected event (Great Shakeout) that have been inputted by user(s) on client device(s) 104 and uploaded to server 102 and stored on database 118 of memory 112 in association with the indicated asset and event. Selecting one of the photographs of FIG. 17A takes the user to a screen such as that shown in FIG. 17B.

FIG. 17B is a screenshot showing a close-up 1703 or image detail of the one of the images 1701 selected from the screen of FIG. 17A. The screen of FIG. 17B may still show all the images of that of FIG. 17A, but in a thumbnail gallery 1705, on a smaller scale than images 1701 of FIG. 17A. The screen of FIG. 17B may also include image identification fields 1707, 1709, indicating which user inputted ("uploaded") the selected image and the date and time it was taken, respectively. FIG. 17B also shows a textual annotation associated with the selected image, including a title 1711 of the image and a comment 1713 providing further description. The annotation is stored in association with the image and, by using edit button 1715, may be edited by (authorized) users, for example, the user who took the photograph and other authorized users.

Figure 19:
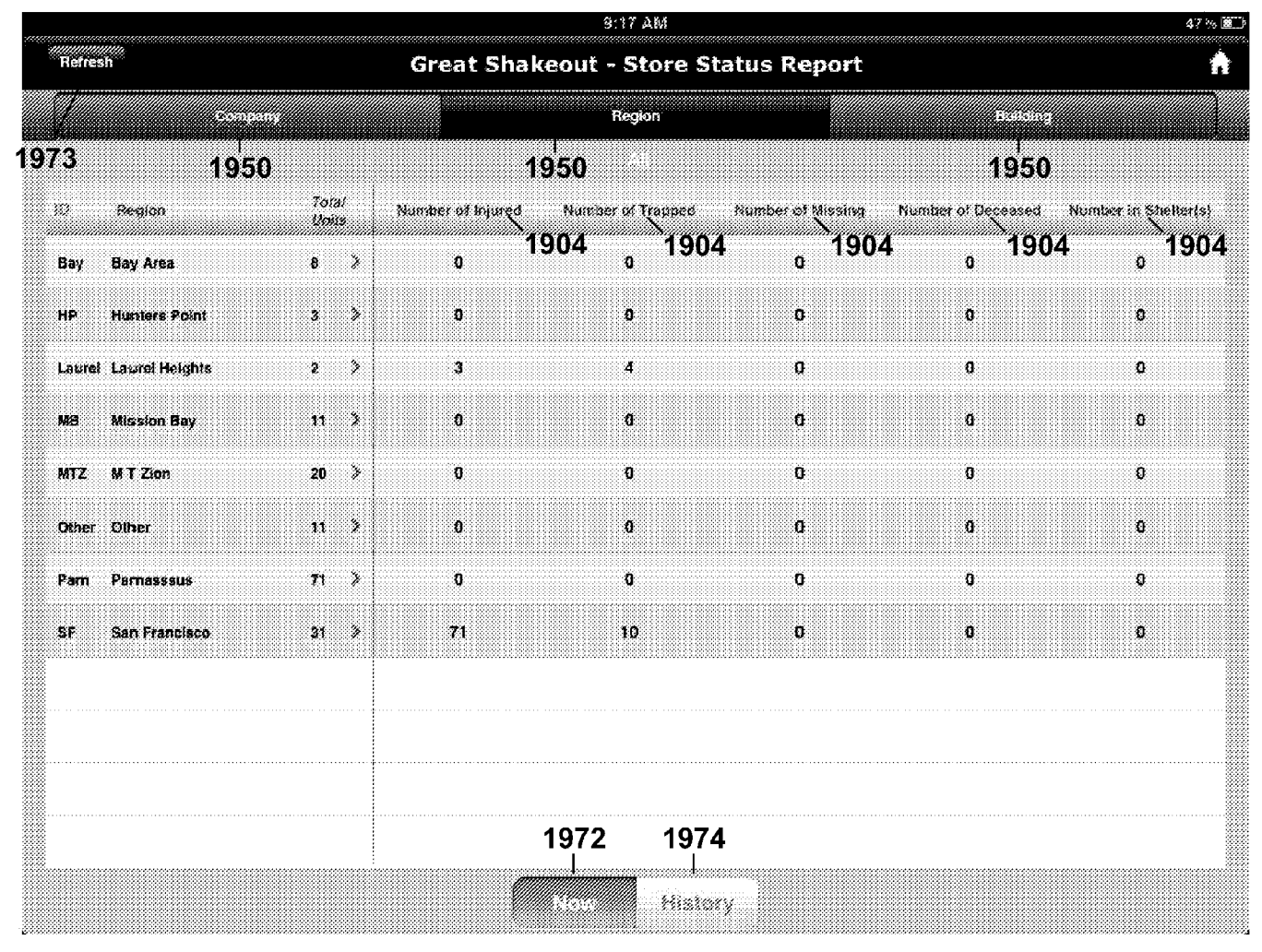
Figure 20A:
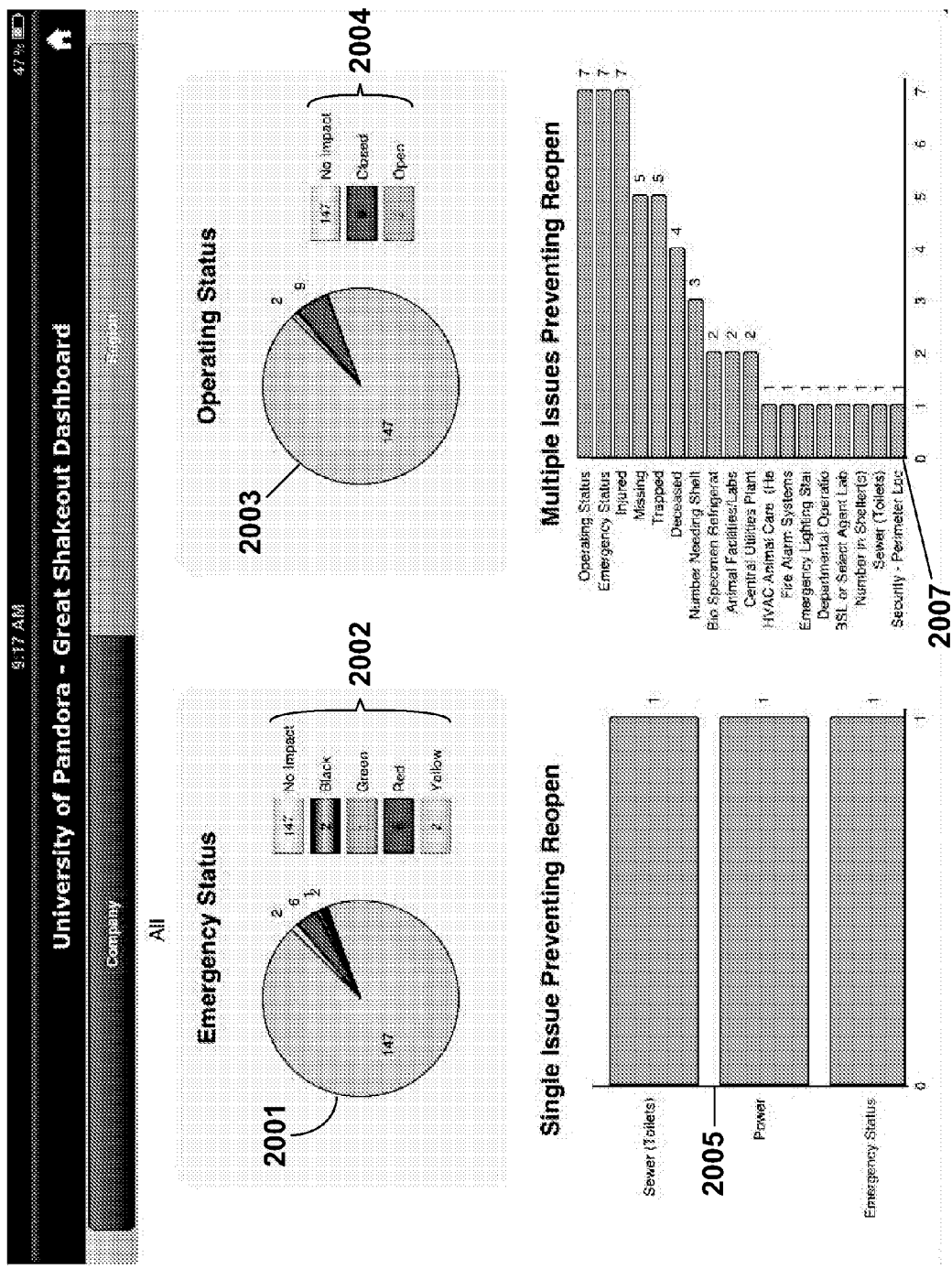
FIGS. 20A and 20B are screenshots of dashboards for viewing reports generated from information on multiple assets, in accordance with some embodiments.
Figure 20B:
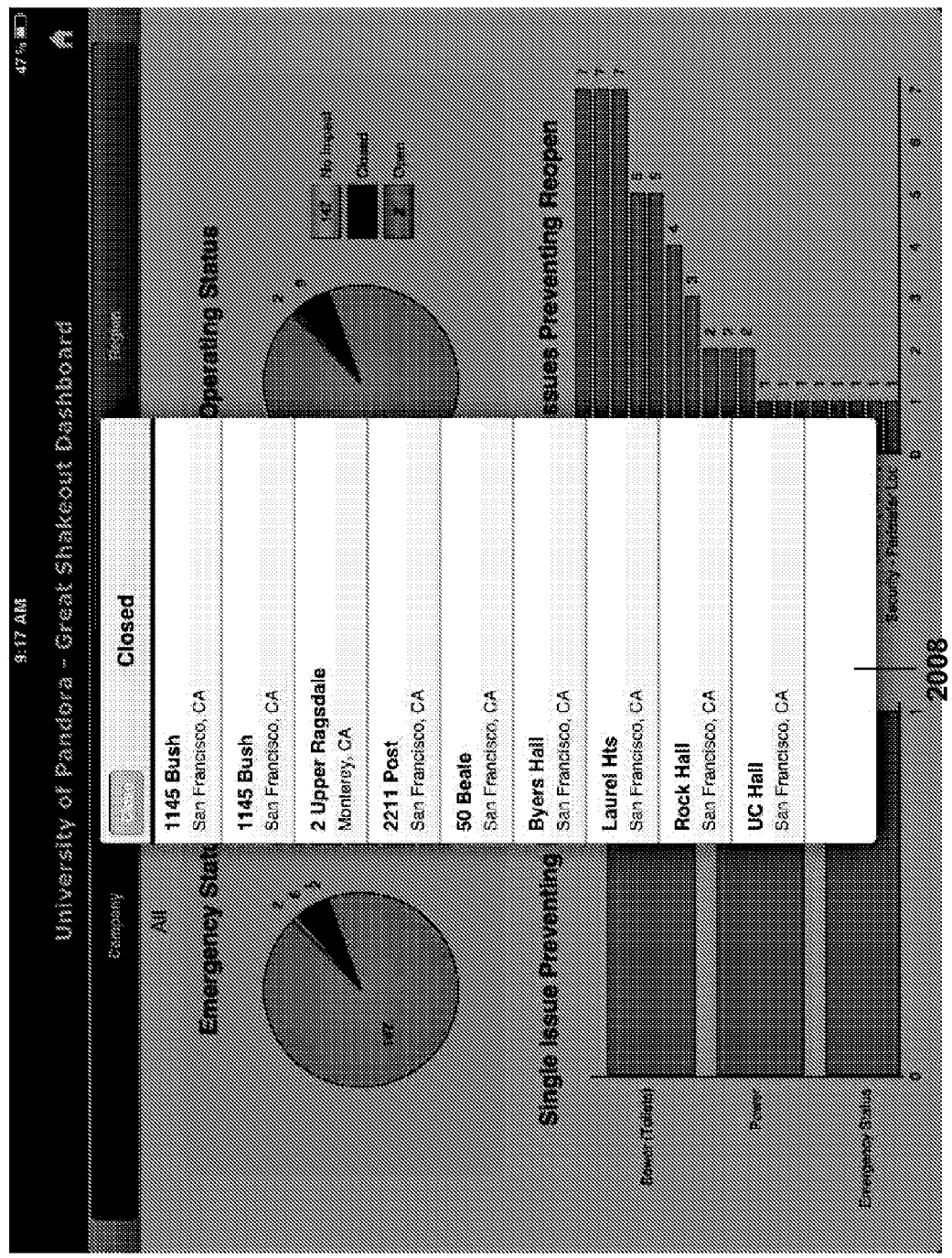

The portions of crisis management methods 700, 800 pertaining to the accessing or viewing of reports will be described with reference to FIGS. 19, 20A and 20B. FIG. 19 is a screenshot of a status report screen for viewing reports on the status of assets. FIGS. 20A and 20B are screenshots of a dashboard for viewing statistical reports generated from information about all the assets or a group of assets, with FIG. 20B illustrating a popup window allowing a user to drill down into the statistical information presented to obtain information specifying particular assets.

Recalling the home screen, shown in FIG. 13, selecting the Reports icon 1338 depicted there takes the user to the screen shown in FIG. 19. The report of FIG. 19 shows information similar to that of FIG. 14, but for multiple assets and in a more summary fashion. In the screen of FIG. 19, status information may be viewed per asset (building), per area/division (region), or for the organization/corporate entity as a whole (company), via the three tabs for these categories 1950. The information fields 1904 ("Number of injured," "Number of trapped," etc.) are similar but not identical to information fields 1404 of FIG. 14 (the example appearing in FIG. 19 is different than that of FIG. 14, e.g., in FIG. 19 the organization is a company with multiple retail stores). As noted above, the categories 1950 may be easily customized by the user. In FIG. 19, summary information on multiple assets may be viewed on a single screen, in contrast to FIG. 14, where information for a single asset is illustrated. Also, the current status information or older status information may be viewed, via the Now button 1972 and the History button 1974, respectively. Using the screen of FIG. 19, users may jump from between different levels of organizational hierarchy (i.e., different categories 1950) with a single click. The Refresh button 1973 permits a user to effectively update the status report to incorporate any new updates that have occurred since the screen was initially navigated to. Upon user request, the information presented may be downloaded to a spreadsheet or a file and may be sent directly to a user's computer, e.g., via an email attachment, or otherwise.

Software service 116 may also perform analysis of information received and, based on the analysis, generate, e.g., statistical reports based on information from all the assets or a portion of the assets, showing collective status information reflecting recovery performance of the organization as a whole, via various parameters. An example of such a report is shown in the screenshot of FIG. 20A. The dashboard in FIG. 20A shows, e.g., status for the collectivity of assets, i.e., the numbers of assets having different statuses (shown by the pie charts 2001, 2003), as well as the numbers of assets that are not operational due to single issues and due to multiple issues, with identification of which issues affect how many assets (shown by the graphs 2005, 2007, respectively). The different statuses may include, e.g., open versus closed properties (operational versus non-operational assets), as shown in pie chart 2003, and different levels of impact, as shown in pie chart 2001. By selecting one of the buttons 2002, 2004 associated with the pie charts 2001, 2003, respectively, a user opens a popup window containing a list identifying the specific assets that have that status. Such a popup window 2008 is illustrated in FIG. 20B, showing a list of those assets having the "closed" status. Software service 116 may continually generate updated versions of the reports of FIGS. 19, 20A and 20B, e.g., whenever new information is received. A user may add additional graphs by selecting a type of graph and filter condition(s) for the data to be displayed on the graph.

The viewing of status information and reports, as described above with reference to FIGS. 15, 16, 17A, 17B, 19, 20A, and 20B, may be performed using display device 219 of client device 104. In some embodiments, output may be provided in different forms, e.g., in audio form outputted to a speaker, printed, exported to PDF, MS-Word or other file format (that may be transmitted electronically to an electronic device), etc.

In addition, with regard to the viewing of status information and reports, crisis management system 100 may be configured so as to provide users with information of interest related to the event at hand, e.g., weather or news information. Such information may be obtained from third party sources and provided via screens such as the those for viewing status or viewing reports described above.

The portion of crisis management methods 700, 800 pertaining to communication—sending and receiving messages among users—will be described with reference to FIGS. 21-23.

Figure 21:
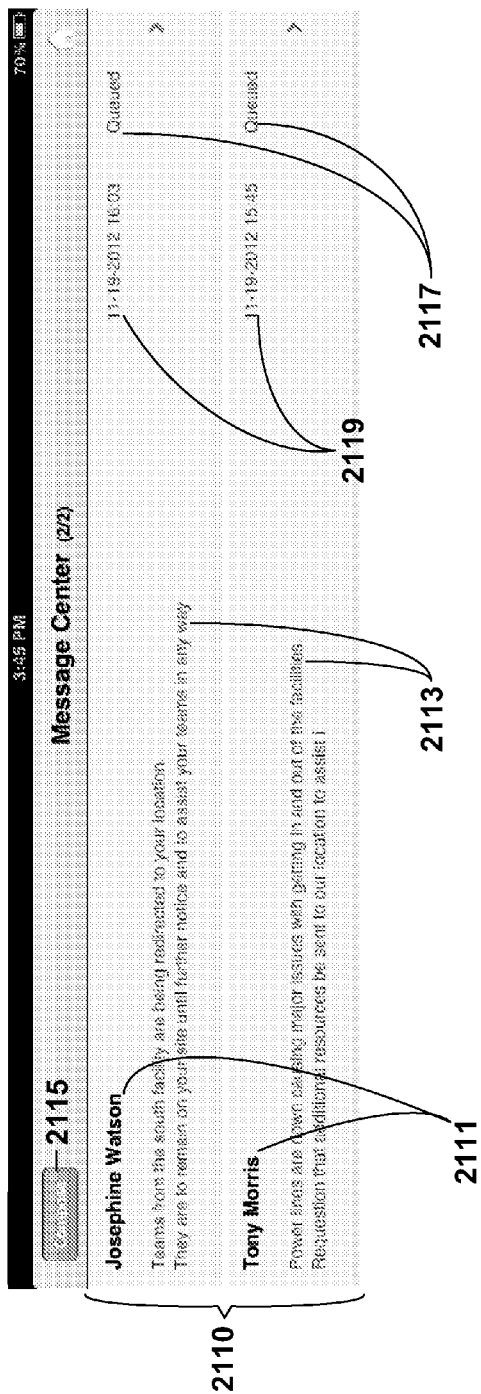
FIG. 21 is a screenshot of a message center, in accordance with some embodiments.

FIG. 21 is a screenshot showing a message center. The message center may serve the entire organization, e.g., Pandora University. As discussed above with reference to FIGS. 5 and 6, crisis management system 100 is preferably configured such that server 102 receives all messages sent from one client device 104 to another. In addition, as per the arrangement of FIG. 5, a message sent from one client device 104 to another may in fact be sent to server 102 from the sending client device 104 and then transmitted by server 102 to the receiving client device 104. In addition, as discussed above, server 102 may automatically send alerts to all or pertinent ones of client devices 104 whenever the status of an asset changes. Here, with respect to FIG. 21, server 102 includes a message center where all messages sent from one client device 104 to another are stored. Thus, server 102 serves as a centralized communication center, tracking and, preferably, also sending all messages.

Messages of the message center may be stored in database 118. In addition, as mentioned above, each message stored in the message center was preferably associated with a given asset and a given event at the time the message was created or sent. The messages are stored in the message center in association with the asset and event to which they pertain. Thus, the messages are different from ordinary emails, text messages, and the like. Further, as mentioned above, each message may be time-stamped and date-stamped, with this information also being saved in association with the message. Users can access the message center and view all messages associated with a given asset/event, and can view the chronology of such messages, e.g., can navigate through messages in chronological or reverse chronological order. Of course, authorization may be required to view some or all messages. As shown in FIG. 21, (authorized) users can view all messages 2110 in summary form, including brief message content information 2113, sender identification 2111, status identification 2117 (e.g., queued, sent, etc.), and time and date identification 2119. Clicking on one of the listed messages 2110 brings the user to the screen shown in FIG. 23, where the entire message is visible. FIG. 23 is thus a screenshot of a message.

Figure 22:
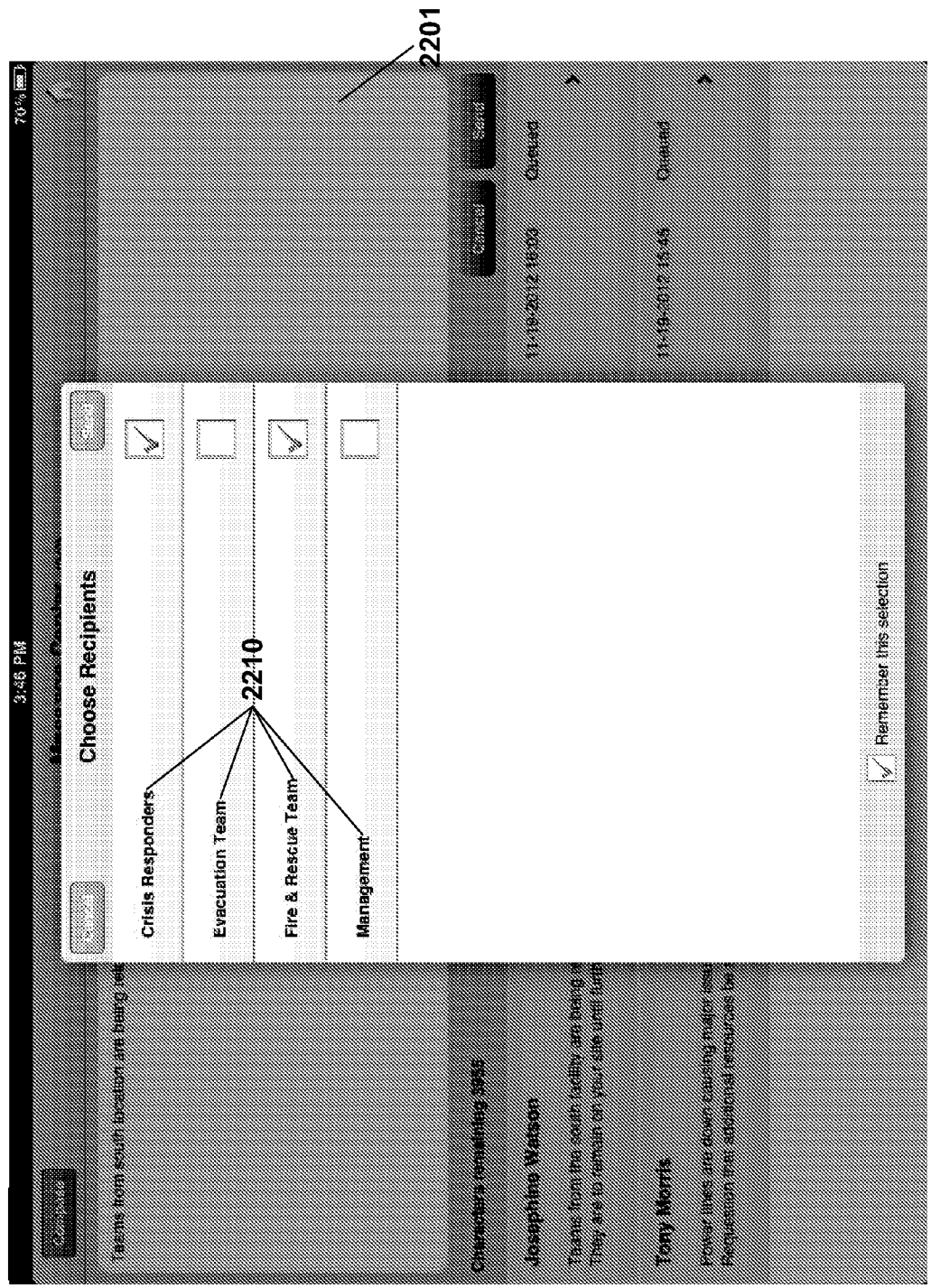
FIG. 22 is a screenshot of a message compose screen, in accordance with some embodiments.
Figure 23:
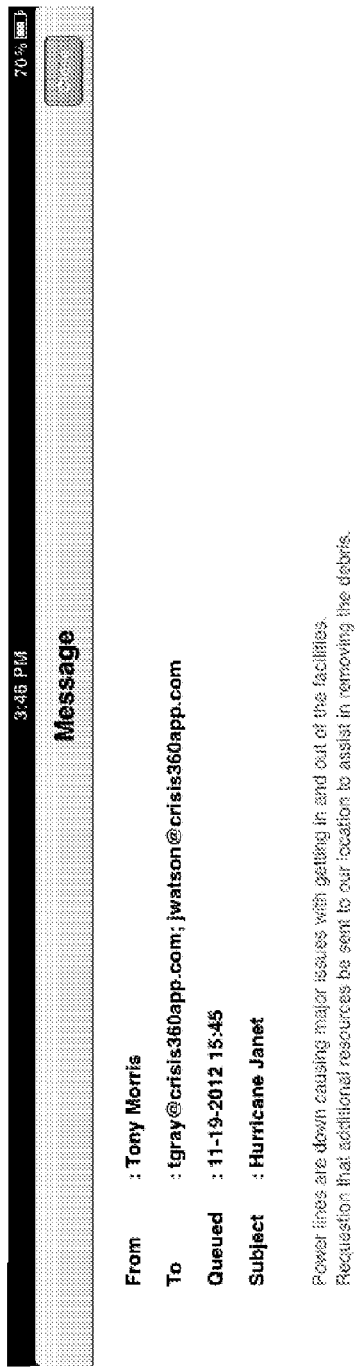
FIG. 23 is a screenshot of a message, in accordance with some embodiments.

Clicking on the compose button 2115 in the screen of FIG. 21 takes the user to the screen of FIG. 22. FIG. 22 is thus a screenshot of a message compose screen, including a message input field 2201 for inputting message text. When a user creates a message, the user must specify the intended recipients of the message. The user may enter the addresses of the recipients individually, or may select one or more user groups 2210 (groups of users), which may be pre-defined by the system, such as "Crisis Responders," "Evacuation Team," "Fire and Rescue," and "Management"; other user groups may include, e.g., a given local response team, the set of all viewers, and all users associated with a given asset or division. In some cases, the system may be configured such that the client device 104 of a user (device profile or user profile) of a certain group or response team, or associated with a certain asset, may be pre-programmed to select a particular group of intended recipients. In some cases, the group of intended recipients may be automatically selected based on the given asset and/or event that the message pertains to. In any event, when a user creates a message, software application 216 associates the (client devices 104 of the) intended recipients with the created message. When the client device 104 sends the message to server 102 for transmission to the intended recipients (or when the client device 104 sends a copy of the message to the server 102 under the above-noted configuration of the arrangement of FIG. 6), client device 104 sends transmission data to server 102 in association with the message. The transmission data includes information indicating the (client devices 104 of the) intended recipients of the message. Under the arrangement of FIG. 5, server 102 uses the recipient information in the transmission data to send the message to the client devices 104 of the intended recipients. In any event, server 102 stores the intended recipient information in association with the message in the message center.

Transmission of messages among client devices 104 and server 102 may be via email, text message (e.g., short messaging service (SMS), multimedia messaging service (MMS)) or by another manner of transmission. Messages may include not only textual information, as illustrated in FIG. 22, but also graphical, image/video, or audio information.

Figure 24:
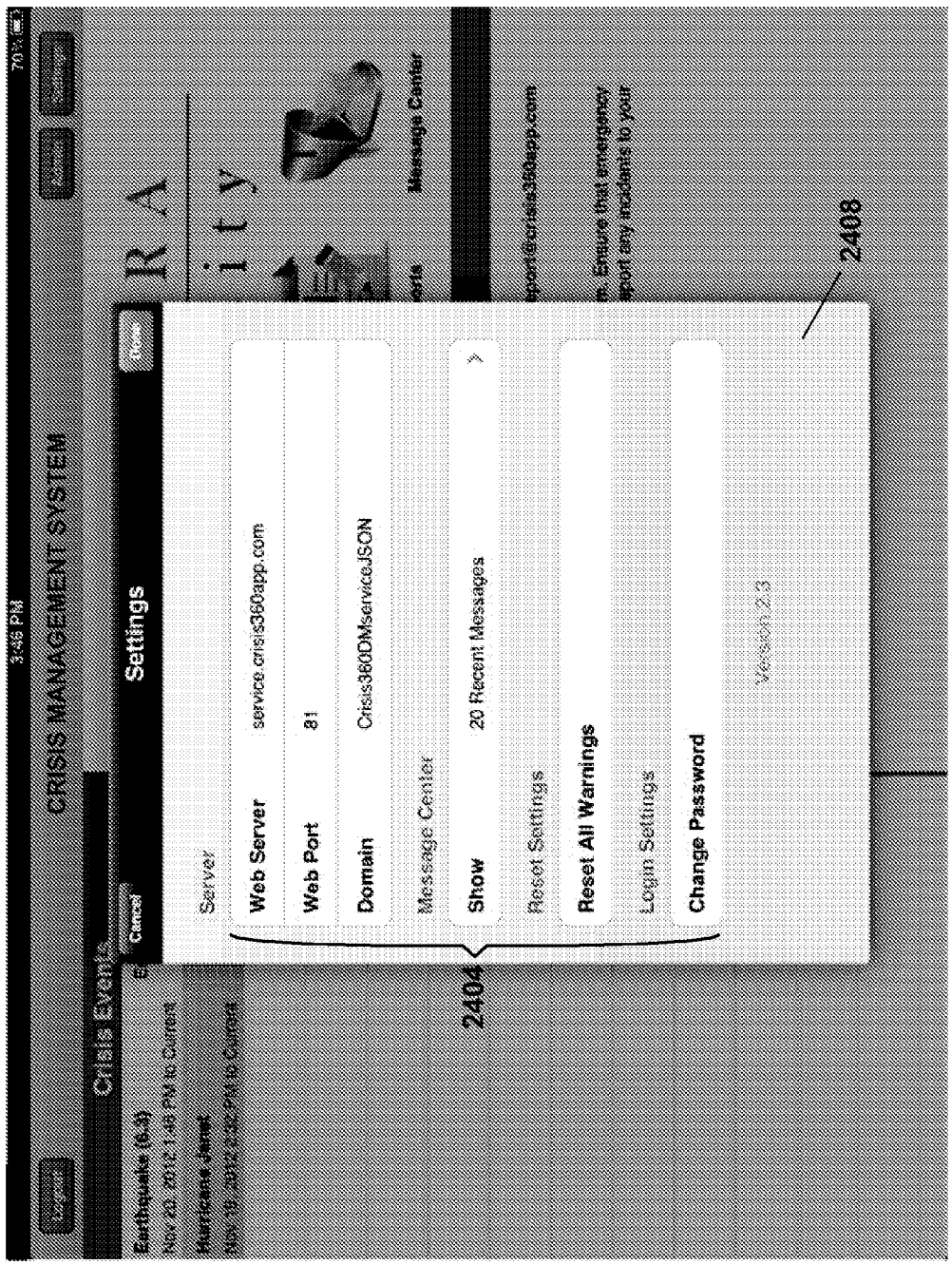
FIG. 24 is a screenshot of a settings screen for adjusting settings for a crisis management system, in accordance with some embodiments.

FIG. 24 is a screenshot of a settings screen for adjusting settings for a crisis management system, in accordance with some embodiments. As mentioned above with reference to the home screen shown in FIG. 13, selecting the Settings button 1332 in that screen opens a popup window 2408 where the user may view and edit settings for server 102, as illustrated in FIG. 24. Access to this screen may be limited to those users having administrative, executive or the like permission types. As with the other screens described herein, the set of particular fields 2404 (here, i.e., settings that may be adjusted), as well as the format, layout, etc., may be varied from that illustrated.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise or so dictated by the description herein.

Similarly, although example methods or processes have been described with regard to particular steps or operations performed in a particular sequence, numerous modifications could be applied to those methods or processes to derive numerous alternative embodiments of the present invention. For example, alternative embodiments may include methods or processes that use fewer than all of the disclosed steps or operations, methods or processes that use additional steps or operations, and methods or processes in which the individual steps or operations disclosed herein are combined, subdivided, rearranged, or otherwise altered. Similarly, this disclosure describes one or more embodiments wherein various operations are performed by certain systems, applications, module, components, etc. In alternative embodiments, however, those operations could be performed by different components. Also, items such as applications, module, components, etc. may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware. The term "processor" may refer to one or more processors.

Further, each of the method embodiments set forth above, including all combinations of method embodiments, may also be instantiated as an article of manufacture embodiment, wherein an article of manufacture comprises a non-transitory machine-accessible medium containing instructions, the instructions comprising a software application or software service, such as software service 116 or software application 216, wherein the instructions, when executed by the machine, cause the machine to perform the respective method. The machine may be, e.g., processor 110 or 210, a processor-based system such as system 100, or a processor-based device such as client device 104.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A system for managing events comprising:
   a server comprising:
      a processor configured for executing software;
      a network interface configured for communicating with a plurality of client devices via a communication network;
      a memory configured for storing the software and information; and
      the software, wherein the software, when executed by the processor, performs operations comprising:
         defining one or more items, each item comprising an event or an asset;
         receiving, from a first one of the client devices via the communication network, first information and, in association with the first information, first data indicating a first item to which the first information pertains;

storing the received first information and, in association therewith, the received first data in the memory;

permitting ones of the client devices to access the received first information via the communication network;

receiving, from a second one of the client devices via the communication network, second information and, in association with the second information, second data indicating a second item to which the second information pertains;

storing the received second information and, in association therewith, the received second data in the memory; and permitting ones of the client devices to access the received second information via the communication network, wherein, if the first and second items are the same, the first and second information are stored in association with each other, and wherein the first and second client devices may be the same or different devices.

2. The system according to claim 1, wherein the operation of defining one or more items, each item comprising an event or an asset, comprises:
defining one or more events; and
defining one or more assets.

3. The system according to claim 1, wherein the operations further comprise:
receiving, from a third one of the client devices via the communication network, third information and, in association with the third information, transmission data indicating selected ones of the client devices to which the third information is designated for transmission;
storing the received third information in the memory; and
permitting ones of the client devices to access the received third information via the communication network,
wherein the first and third client devices may be the same or different devices.

4. The system according to claim 3, wherein the operations further comprise:
receiving, from the third client device via the communication network, in association with the third information, third data indicating a third item to which the third information pertains; and
storing, in association with the third information, the received third data in the memory,
wherein, if the first and third items are the same, the first and third information are stored in association with each other.

5. The system according to claim 3, wherein the operations further comprise:
transmitting the third information to the selected ones of the client devices via email or text message.

6. The system according to claim 3, wherein the operations further comprise:
receiving, from the third client device via the communication network, in association with the third information, third data indicating a third item to which the third information pertains; and
storing, in association with the third information, the received third data in the memory;
wherein the permitting the accessing of the first and third information comprises permitting selective accessing of the first and third information, based upon characteristics of the first and third items.

7. The system according to claim 1, wherein the first information comprises image, video or audio information.

8. The system according to claim 1, wherein the operations further comprise:
receiving data indicating a time at which the first information was inputted into the first client device;
storing in the memory, in association with the received first information, the data indicating the time at which the first information was inputted; and
permitting ones of the client devices to access the data indicating the time at which the first information was inputted.

9. The system according to claim 1, wherein the operations further comprise:
receiving data indicating a first time at which the first information was inputted into the first client device;
storing in the memory, in association with the received first information, the data indicating the first time at which the first information was inputted;
receiving, from a fourth one of the client devices via the communication network, fourth information, data indicating a second time at which the fourth information was inputted into the fourth client device, and, in association with the fourth information, fourth data indicating that the fourth information pertains to the first item, the fourth time being later than the first time and the fourth information comprising an update of the first information;
identifying the received fourth information as an update of the first information;
storing in the memory the received fourth information as an update of the first information and, in association with the received fourth information, the data indicating the second time at which the fourth information was inputted; and
permitting ones of the client devices to access the received first information, the received fourth information identified as an update of the first information, the data indicating the first time at which the first information was inputted, and the data indicating the second time at which the fourth information was inputted,
wherein any of the first, second and fourth client devices may be the same device or different devices.

10. The system according to claim 9, wherein the operations further comprise sending a notification to ones of the client devices after identification of the received fourth information as an update of the first information.

11. The system according to claim 1, wherein the operations further comprise:
for each defined item, defining one or more groups of authorized users, each group of authorized users comprising one or more authorized user;
for each defined group of authorized users, authorizing the users thereof to perform one or more of the following: a) inputting, to one or more of the client devices, for uploading to the server, information pertaining to one or more of the defined items; and b) accessing, via one or more of the client devices from the server, information pertaining to one or more of the defined items; and
performing one or both of the following:
prior to the inputting of the information or prior to the uploading of the information, authenticating a user; and
prior to the accessing of the information, authenticating a user.

12. The system according to claim 1, wherein the operations further comprise:

defining a status of the first item based on the first information;

defining a group of authorized users comprising one or more users authorized to lock or unlock the status of the first item;

in response to a request to lock the status made by a user authorized to lock the status, preventing the status from being changed; and in response to a request to unlock the status made by a user authorized to unlock the status, permitting the status to be changed, wherein, changing the status comprises changing the status based on additional information that pertains to the first item and that has been received from one of the client devices via the communication network.

13. The system according to claim 1, further comprising the plurality of client devices, wherein the server is located geographically remotely from one or more of the client devices.

14. A method for managing events, performed by software operating on a server, the server comprising a processor configured for executing the software, a network interface configured for communicating with a plurality of client devices via a communication network, and a memory configured for storing the software and information, the method comprising:

defining one or more items, each item comprising an event or an asset;

receiving, from a first one of the client devices via the communication network, first information and, in association with the first information, first data indicating a first item to which the first information pertains;

storing the received first information and, in association therewith, the received first data in the memory;

permitting ones of the client devices to access the received first information via the communication network;

receiving, from a second one of the client devices via the communication network, second information and, in association with the second information, second data indicating a second item to which the second information pertains;

storing the received second information and, in association therewith, the received second data in the memory; and permitting ones of the client devices to access the received second information via the communication network, wherein, if the first and second items are the same, the first and second information are stored in association with each other, and wherein the first and second client devices may be the same or different devices.

15. The method according to claim 14, wherein the step of defining one or more items, each item comprising an event or an asset, comprises:

defining one or more events; and defining one or more assets.

16. The method according to claim 14, further comprising:

receiving, from a third one of the client devices via the communication network, third information and, in association with the third information, transmission data indicating selected ones of the client devices to which the third information is designated for transmission;

storing the received third information in the memory; and permitting ones of the client devices to access the received third information via the communication network, wherein the first and third client devices may be the same or different devices.

17. The method according to claim 16, further comprising:

receiving, from the third client device via the communication network, in association with the third information, third data indicating a third item to which the third information pertains; and storing, in association with the third information, the received third data in the memory, wherein, if the first and third items are the same, the first and third information are stored in association with each other.

18. The method according to claim 16, further comprising transmitting the third information to the selected ones of the client devices via email or text message.

19. The method according to claim 16, further comprising:

receiving, from the third client device via the communication network, in association with the third information, third data indicating a third item to which the third information pertains; and storing, in association with the third information, the received third data in the memory;

wherein the permitting the accessing of the first and third information comprises permitting selective accessing of the first and third information, based upon characteristics of the first and third items.

20. The method according to claim 14, wherein the first information comprises image, video or audio information.

21. The method according to claim 14, further comprising:

receiving data indicating a time at which the first information was inputted into the first client device;

storing in the memory, in association with the received first information, the data indicating the time at which the first information was inputted; and permitting ones of the client devices to access the data indicating the time at which the first information was inputted.

22. The method according to claim 14, further comprising:

receiving data indicating a first time at which the first information was inputted into the first client device;

storing in the memory, in association with the received first information, the data indicating the first time at which the first information was inputted;

receiving, from a fourth one of the client devices via the communication network, fourth information, data indicating a second time at which the fourth information was inputted into the fourth client device, and, in association with the fourth information, fourth data indicating that the fourth information pertains to the first item, the second time being later than the first time and the fourth information comprising an update of the first information;

identifying the received fourth information as an update of the first information;

storing in the memory the received fourth information as an update of the first information and, in association with the received fourth information, the data indicating the second time at which the fourth information was inputted; and permitting ones of the client devices to access the received first information, the received fourth information identified as an update of the first information, the data indicating the first time at which the first information was inputted, and the data indicating the second time at which the fourth information was inputted, wherein any of the first, second and fourth client devices may be the same device or different devices.

23. The method according to claim 22, further comprising:
sending a notification to ones of the client devices after identification of the received fourth information as an update of the first information.

24. The method according to claim 14, further comprising:
for each defined item, defining one or more groups of authorized users, each group of authorized users comprising one or more authorized user;
for each defined group of authorized users, authorizing the users thereof to perform one or more of the following: a) inputting, to one or more of the client devices, for uploading to the server, information pertaining to one or more of the defined items; and b) accessing, via one or more of the client devices from the server, information pertaining to one or more of the defined items; and
performing one or both of the following:
prior to the inputting of the information or prior to the uploading of the information, authenticating a user; and
prior to the accessing of the information, authenticating a user.

25. The method according to claim 14, further comprising:
defining a status of the first item based on the first information;
defining a group of authorized users comprising one or more users authorized to lock or unlock the status of the first item;
in response to a request to lock the status made by a user authorized to lock the status, preventing the status from being changed; and
in response to a request to unlock the status made by a user authorized to unlock the status, permitting the status to be changed,
wherein, changing the status comprises changing the status based on additional information that pertains to the first item and that has been received from one of the client devices via the communication network.

26. An article of manufacture comprising a non-transitory machine-accessible medium containing instructions that, when executed by a system comprising a processor, a network interface configured for communicating with a plurality of client devices via a communication network, and a memory configured for storing the instructions and information, enable the system to perform operations comprising:
defining one or more items, each item comprising an event or an asset;
receiving, from a first one of the client devices via the communication network, first information and, in association with the first information, first data indicating a first item to which the first information pertains;
storing the received first information and, in association therewith, the received first data in the memory;
permitting ones of the client devices to access the received first information via the communication network;
receiving, from a second one of the client devices via the communication network, second information and, in association with the second information, second data indicating a second item to which the second information pertains;
storing the received second information and, in association therewith, the received second data in the memory; and
permitting ones of the client devices to access the received second information via the communication network,
wherein, if the first and second items are the same, the first and second information are stored in association with each other, and
wherein the first and second client devices may be the same or different devices.

27. The article of manufacture according to claim 26, wherein the operation of defining one or more items, each item comprising an event or an asset, comprises:
defining one or more events; and
defining one or more assets.

28. The article of manufacture according to claim 26, wherein the operations further comprise:
receiving, from a third one of the client devices via the communication network, third information and, in association with the third information, transmission data indicating selected ones of the client devices to which the third information is designated for transmission;
storing the received third information in the memory; and
permitting ones of the client devices to access the received third information via the communication network,
wherein the first and third client devices may be the same or different devices.

29. The article of manufacture according to claim 28, wherein the operations further comprise:
receiving, from the third client device via the communication network, in association with the third information, third data indicating a third item to which the third information pertains; and
storing, in association with the third information, the received third data in the memory, wherein, if the first and third items are the same, the first and third information are stored in association with each other.

30. The article of manufacture according to claim 28, wherein the operations further comprise transmitting the third information to the selected ones of the client devices via email or text message.

31. The article of manufacture according to claim 28, wherein the operations further comprise:
receiving, from the third client device via the communication network, in association with the third information, third data indicating a third item to which the third information pertains; and
storing, in association with the third information, the received third data in the memory;
wherein the permitting the accessing of the first and third information comprises permitting selective accessing of the first and third information, based upon characteristics of the first and third items.

32. The article of manufacture according to claim 26, wherein the first information comprises image, video or audio information.

33. The article of manufacture according to claim 26, wherein the operations further comprise:
receiving data indicating a time at which the first information was inputted into the first client device;
storing in the memory, in association with the received first information, the data indicating the time at which the first information was inputted; and
permitting ones of the client devices to access the data indicating the time at which the first information was inputted.

34. The article of manufacture according to claim 26, wherein the operations further comprise:
receiving data indicating a first time at which the first information was inputted into the first client device;
storing in the memory, in association with the received first information, the data indicating the first time at which the first information was inputted;
receiving, from a fourth one of the client devices via the communication network, fourth information, data indicating a second time at which the fourth information was inputted into the fourth client device, and, in association with the fourth information, fourth data indicating that the fourth information pertains to the first item, the second time being later than the first time and the fourth information comprising an update of the first information;

identifying the received fourth information as an update of the first information;

storing in the memory the received fourth information as an update of the first information and, in association with the received fourth information, the data indicating the second time at which the fourth information was inputted; and permitting ones of the client devices to access the received first information, the received fourth information identified as an update of the first information, the data indicating the first time at which the first information was inputted, and the data indicating the second time at which the fourth information was inputted, wherein any of the first, second and fourth client devices may be the same device or different devices.

35. The article of manufacture according to claim 34, wherein the operations further comprise sending a notification to ones of the client devices after identification of the received fourth information as an update of the first information.

36. The article of manufacture according to claim 26, wherein the operations further comprise:
for each defined item, defining one or more groups of authorized users, each group of authorized users comprising one or more authorized user;
for each defined group of authorized users, authorizing the users thereof to perform one or more of the following: a) inputting, to one or more of the client devices, for uploading to the server, information pertaining to one or more of the defined items; and b) accessing, via one or more of the client devices from the server, information pertaining to one or more of the defined items; and
performing one or both of the following:
prior to the inputting of the information or prior to the uploading of the information, authenticating a user; and
prior to the accessing of the information, authenticating a user.

37. The article of manufacture according to claim 26, wherein the operations further comprise:
defining a status of the first item based on the first information;
define a group of authorized users comprising one or more users authorized to lock or unlock the status of the first item;
in response to a request to lock the status made by a user authorized to lock the status, prevent the status from being changed; and
in response to a request to unlock the status made by a user authorized to unlock the status, permit the status to be changed,
wherein, changing the status comprises changing the status based on additional information that pertains to the first item and that has been received from one of the client devices via the communication network.

38. A client device for managing events, comprising:
a processor configured for executing software;
a network interface configured for permitting the client device to communicate with a server and with other client devices via a communication network;
an input device configured for permitting information to be inputted into the client device;
a memory configured for storing the software, information inputted via the input device, and information received via the communication network; and
the software executable by the processor, wherein the software when executed performs operations comprising:
defining one or more items, each item comprising an event or an asset;
receiving first information inputted via the input device;
associating first data with the first information, the first data indicating a first item to which the first information pertains;
transmitting, to the server via the communication network, the first information and, in association with the first information, the first data;
accessing, from the server via the communication network, second information and, in association therewith, second data indicating a second item to which the second information pertains;
receiving third information inputted via the input device;
transmitting the third information to the server and to one or more of the client devices via the communication network; and
receiving fourth information from another client device via the communication network.

39. The device according to claim 38, wherein the operation of defining one or more items, each item comprising an event or an asset, comprises:
defining one or more assets; and
defining one or more events.

40. The device according to claim 38, further comprising:
a display device configured to display information on the client device,
wherein the operations further comprise:
displaying the accessed second information on the display device.

41. The device according to claim 38, wherein the transmission of the third information to one or more of the client devices and the reception of the fourth information from another client device occurs via the server.

42. The device according to claim 38, wherein the operations further comprise:
associating data with the third information, the data indicating item to which the third information pertains; and
transmitting the data to the server via the communication network, in association with the third information.

43. The device according to claim 38, wherein the first information and/or the second information comprises image, video or audio information.

44. The device according to claim 38, wherein the transmission of the third information to the one or more client devices and the reception of the fourth information from another client device is via email or text message.

45. The device according to claim 38, wherein the operations further comprise:
transmitting to the server, in association with the first information, data indicating a time at which the first information was inputted.

46. The device according to claim 38, wherein the operations further comprise:
transmitting to the server, in association with the first information, data indicating a first time at which the first information was inputted;
receiving fifth information inputted via the input device, the fifth information comprising an update of the first information;

associating fifth data with the fifth information, the fifth data indicating that the fifth information pertains to the first item; and transmitting to the server, the fifth information and, in association with the fifth information, the fifth data and data indicating a second time at which the fifth information was inputted, the second time being later than the first time.

47. The device according to claim 38, wherein the operations further comprise:

for each defined item, defining one or more groups of authorized users, each group of authorized users comprising one or more authorized user;

for each defined group of authorized users, authorizing the users thereof to perform one or more of the following: a) inputting, to one or more of the client devices, for uploading to the server, information pertaining to one or more of the defined items; and b) accessing, via one or more of the client devices from the server, information pertaining to one or more of the defined items; and performing one or both of the following:

prior to the inputting of the information or prior to the uploading of the information, authenticating a user; and prior to the accessing of the information, authenticating a user.

48. The device according to claim 38, wherein the operations further comprise:

defining a status of the first item based on the first information;

defining a group of authorized users comprising one or more users authorized to lock or unlock the status of the first item;

in response to a request to lock the status made by a user authorized to lock the status, preventing the status from being changed; and in response to a request to unlock the status made by a user authorized to unlock the status, permitting the status to be changed, wherein changing the status comprises changing the status based on additional information that pertains to the first item.

49. The device according to claim 38, wherein the operations further comprise:

selectively accessing information from the server based upon characteristics of defined items to which the information pertains.

50. A method for managing events, performed by a software application operating on a client device, the client device comprising a processor configured for executing the software application, a network interface configured for permitting the client device to communicate with a server and with other client devices via a communication network, an input device configured for permitting information to be inputted into the client device, and a memory configured for storing the software application, information inputted via the input device, and information received via the communication network, the method comprising:

defining one or more items, each item comprising an event or an asset;

receiving first information inputted via the input device;

associating first data with the first information, the first data indicating a first item to which the first information pertains;

transmitting, to the server via the communication network, the first information and, in association with the first information, the first data;

accessing, from the server via the communication network, second information and, in association therewith, second data indicating a second event and a second asset to which the second information pertains;

receiving third information inputted via the input device;

transmitting the third information to the server and to one or more of the client devices via the communication network; and receiving fourth information from another client device via the communication network.

51. The method according to claim 50, wherein the step of defining one or more items, each item comprising an event or an asset, comprises:

defining one or more assets; and defining one or more events.

52. The method according to claim 50, wherein the client device further comprises a display device configured to display information on the client device, and wherein the method further comprises displaying the accessed second information on the display device.

53. The method according to claim 50, wherein the transmission of the third information to one or more of the client devices and the reception of the fourth information from another client device occurs via the server.

54. The method according to claim 50, further comprising:

associating data with the third information, the data indicating an item to which the third information pertains; and transmitting the data to the server via the communication network, in association with the third information.

55. The method according to claim 50, wherein the first and/or the second information comprises image, video or audio information.

56. The method according to claim 50, wherein the transmission of the third information to the one or more client devices and the reception of the fourth information from another client device is via email or text message.

57. The method according to claim 50, further comprising:

transmitting to the server, in association with the first information, data indicating a time at which the first information was inputted.

58. The method according to claim 50, further comprising:

transmitting to the server, in association with the first information, data indicating a first time at which the first information was inputted;

receiving fifth information inputted via the input device, the fifth information comprising an update of the first information;

associating fifth data with the fifth information, the fifth data indicating that the fifth information pertains to the first item; and transmitting to the server, the fifth information and, in association with the fifth information, the fifth data and data indicating a second time at which the fifth information was inputted, the second time being later than the first time.

59. The method according to claim 50, further comprising:

for each defined item, defining one or more groups of authorized users, each group of authorized users comprising one or more authorized user;

for each defined group of authorized users, authorizing the users thereof to perform one or more of the following: a) inputting, to one or more of the client devices, for uploading to the server, information pertaining to one or more of the defined items; and b) accessing, via one or more of the client devices from the server, information pertaining to one or more of the defined items; and performing one or both of the following:

prior to the inputting of the information or prior to the uploading of the information, authenticating a user; and prior to the accessing of the information, authenticating a user.

60. The method according to claim 50, further comprising:

defining a status of the first item based on the first information;

defining a group of authorized users comprising one or more users authorized to lock or unlock the status of the first item;

in response to a request to lock the status made by a user authorized to lock the status, preventing the status from being changed; and in response to a request to unlock the status made by a user authorized to unlock the status, permitting the status to be changed, wherein changing the status comprises changing the status based on additional information that pertains to the first item.

61. The method according to claim 50, further comprising:

selectively accessing information from the server based upon characteristics of defined items to which the information pertains.

62. An article of manufacture comprising a non-transitory machine-accessible medium containing instructions that, when executed by a device comprising a processor, a network interface configured for permitting the processor-based device to communicate with a server and with other devices via a communication network, an input device configured for permitting information to be inputted into the processor-based device, and a memory configured for storing the instructions, information inputted via the input device, and information received via the communication network, enable the system to perform operations comprising:

defining one or more items, each item comprising an event or an asset;

receiving first information inputted via the input device;

associating first data with the first information, the first data indicating a first item to which the first information pertains;

transmitting, to the server via the communication network, the first information and, in association with the first information, the first data;

accessing, from the server via the communication network, second information and, in association therewith, second data indicating a second item to which the second information pertains;

receiving third information inputted via the input device;

transmit the third information to the server and to one or more of the client devices via the communication network; and receiving fourth information from another client device via the communication network.

63. The article of manufacture according to claim 62, wherein the operation of defining one or more items, each item comprising an event or an asset, comprises:

defining one or more assets; and defining one or more events.

64. The article of manufacture according to claim 62, wherein the processor-based device further comprises a display device configured to display information on the processor-based device, and wherein the operations further comprise displaying the accessed second information on the display device.

65. The article of manufacture according to claim 62, wherein the transmission of the third information to one or more of the client devices and the reception of the fourth information from another client device occurs via the server.

66. The article of manufacture according to claim 62, wherein the operations further comprise:

associating data with the third information, the data indicating an item to which the third information pertains; and transmitting the data to the server via the communication network, in association with the third information.

67. The article of manufacture according to claim 62, wherein the transmission of the third information to the one or more client devices and the reception of the fourth information from another client device is via email or text message.

68. The article of manufacture according to claim 62, wherein the first and/or the second information comprises image, video or audio information.

69. The article of manufacture according to claim 62, wherein the operations further comprise:

transmitting to the server, in association with the first information, data indicating a time at which the first information was inputted.

70. The article of manufacture according to claim 62, wherein the operations further comprise:

transmitting to the server, in association with the first information, data indicating a first time at which the first information was inputted;

receiving fifth information inputted via the input device, the fifth information comprising an update of the first information;

associating fifth data with the fifth information, the fifth data indicating that the fifth information pertains to the first item; and transmitting to the server, the fifth information and, in association with the fifth information, the fifth data and data indicating a second time at which the fifth information was inputted, the second time being later than the first time.

71. The article of manufacture according to claim 62, wherein the operations further comprise:

for each defined item, defining one or more groups of authorized users, each group of authorized users comprising one or more authorized user;

for each defined group of authorized users, authorizing the users thereof to perform one or more of the following: a) inputting, to one or more of the client devices, for uploading to the server, information pertaining to one or more of the defined items; and b) accessing, via one or more of the client devices from the server, information pertaining to one or more of the defined items; and performing one or both of the following:

prior to the inputting of the information or prior to the uploading of the information, authenticating a user; and prior to the accessing of the information, authenticating a user.

72. The article of manufacture according to claim 62, wherein the operations further comprise:

defining a status of the first item based on the first information;

defining a group of authorized users comprising one or more users authorized to lock or unlock the status of the first item;

in response to a request to lock the status made by a user authorized to lock the status, preventing the status from being changed; and in response to a request to unlock the status made by a user authorized to unlock the status, permitting the status to be changed, wherein changing the status comprises changing the status based on additional information that pertains to the first item.

73. The article of manufacture according to claim 62, wherein the operations further comprise:

selectively accessing information from the server based upon characteristics of defined items to which the information pertains.

* * * * *